(12) United States Patent
An et al.

(10) Patent No.: US 8,947,370 B2
(45) Date of Patent: Feb. 3, 2015

(54) TOUCH PANEL AND METHOD FOR MANUFACTURING THE SAME

(75) Inventors: Su-Chang An, Seoul (KR); Cheol-Se Kim, Daegu (KR); Sang-Soo Hwang, Seoul (KR); Gang-Seob Jung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 530 days.

(21) Appl. No.: 12/778,289

(22) Filed: May 12, 2010

(65) Prior Publication Data

US 2011/0227858 A1 Sep. 22, 2011

(30) Foreign Application Priority Data

Mar. 16, 2010 (KR) ........................ 10-2010-0023445

(51) Int. Cl.
*G06F 3/041* (2006.01)
*G06F 3/044* (2006.01)
*G06F 3/03* (2006.01)

(52) U.S. Cl.
CPC ...... *G06F 3/044* (2013.01); *G06F 2203/04103* (2013.01); *G06F 2203/04112* (2013.01); *G06F 3/0317* (2013.01); *G06F 2203/04111* (2013.01)
USPC ........................................ 345/173; 178/18.01

(58) Field of Classification Search
CPC .................... G06F 3/045; G06F 3/044; G06F 2203/04111; G06F 3/03544; G06F 2203/04112; G06F 2203/04103; G06F 3/0317
USPC .............. 345/93, 173, 174; 178/18.01, 18.02, 178/18.03, 18.06
See application file for complete search history.

(56) References Cited

U.S. PATENT DOCUMENTS

| 6,054,979 | A  | * | 4/2000 | Sellers ........................ 345/173 |
|---|---|---|---|---|
| 7,864,160 | B2 | * | 1/2011 | Geaghan et al. ............. 345/173 |
| 8,144,129 | B2 | * | 3/2012 | Hotelling et al. ............ 345/174 |
| 8,248,328 | B1 | * | 8/2012 | Wedding et al. .............. 345/63 |
| 2002/0154076 | A1 | * | 10/2002 | Greene et al. ................. 345/87 |
| 2002/0154079 | A1 | * | 10/2002 | Shiota et al. .................. 345/87 |
| 2003/0164820 | A1 | * | 9/2003 | Kent ............................ 345/177 |
| 2004/0027451 | A1 | * | 2/2004 | Baker ............................ 348/46 |
| 2004/0041842 | A1 | * | 3/2004 | Lippincott ................... 345/783 |
| 2004/0163562 | A1 | * | 8/2004 | Lewis et al. .................. 101/485 |
| 2005/0030048 | A1 | * | 2/2005 | Bolender et al. ............. 324/661 |
| 2005/0180083 | A1 | * | 8/2005 | Takahara et al. ............. 361/152 |
| 2008/0062139 | A1 | * | 3/2008 | Hotelling et al. ............ 345/173 |
| 2008/0129907 | A1 | * | 6/2008 | Jun et al. ........................ 349/38 |
| 2008/0150905 | A1 | * | 6/2008 | Grivna et al. ................ 345/173 |
| 2008/0264699 | A1 | * | 10/2008 | Chang et al. ................ 178/18.01 |
| 2008/0309634 | A1 | * | 12/2008 | Hotelling et al. ............ 345/173 |
| 2009/0085885 | A1 | * | 4/2009 | Wu et al. ...................... 345/173 |

(Continued)

FOREIGN PATENT DOCUMENTS

| CN | 101501618 A | 8/2009 |
|---|---|---|
| CN | 101571781 A | 11/2009 |

(Continued)

*Primary Examiner* — Michael J Eurice
(74) *Attorney, Agent, or Firm* — Birch, Stewart, Kolasch & Birch, LLP

(57) ABSTRACT

A touch panel includes a plurality of first electrode patterns being serially connected by a plurality of first connection patterns; a plurality of second electode patterns being serially connected by a plurality of second connection patterns; and a plurality of routing lines; wherein at least two of the plurality of first electrode patterns are connected to at least one of the plurality of routing lines.

28 Claims, 40 Drawing Sheets

(56) References Cited

U.S. PATENT DOCUMENTS

| | | |
|---|---|---|
| 2009/0160682 A1* | 6/2009 | Bolender et al. ............... 341/33 |
| 2009/0315854 A1 | 12/2009 | Matsuo |
| 2009/0322704 A1 | 12/2009 | Anno |
| 2010/0033443 A1* | 2/2010 | Hashimoto ................... 345/173 |
| 2010/0045625 A1* | 2/2010 | Yang et al. ................... 345/173 |
| 2010/0302201 A1* | 12/2010 | Ritter et al. .................. 345/174 |

FOREIGN PATENT DOCUMENTS

| | | |
|---|---|---|
| EP | 2 113 827 A2 | 11/2009 |
| EP | 2 157 500 A2 | 2/2010 |
| JP | 2010-009456 A | 1/2010 |
| JP | 2010-039515 A | 2/2010 |
| WO | WO 2010/002202 A2 | 1/2010 |

\* cited by examiner

TOUCH PANEL AND METHOD FOR MANUFACTURING THE SAME

This application claims priority to and the benefit of Korean Patent Application No. 10-2010-0023445, filed on Mar. 16, 2010, which is hereby incorporated by reference as if fully set forth herein.

BACKGROUND OF THE INVENTION

1. Field of the Invention

The present invention relates to a touch panel. More specifically, the present invention relates to a touch panel wherein cells to perform sensing operation are partitioned into a plurality of portions, a plurality of electrodes are divided in the portions, and the electrodes are connected to each other through one routing line to improve touch sensitivity, and a method for fabricating the same.

2. Discussion of the Related Art

In recent years, there is an increasing need for a touch panel wherein a touched portion is sensed by the hand or separate input means and additional information can be transferred in response to the touch. Such a touch panel is adhered to the external surface of a liquid crystal display.

Depending on the touch sensation type, touch panels are classified into resistive touch panels, capacitive touch panels and infrared (IR) touch panels. Owing to factors such as convenience of fabrication and sensitivity, capacitive touch panels attract much attention.

Hereinafter, a conventional capacitive touch panel will be illustrated with reference to the annexed drawings in detail.

FIG. 1 is a plan view illustrating a conventional touch panel and FIG. 2 is an enlarged view of the region A of FIG. 1.

As shown in FIGS. 1 and 2, a conventional capacitive touch panel comprises a substrate 10, and a plurality of rows of first electrodes 11 and a plurality of rows of second electrodes 12 arranged on the substrate 10 such that they cross each other. The touch panel comprises a pad electrode 40 connected to a flexible printed circuit (FPC) 50 including a touch controller 51 at one side of the substrate 10. The row of the first electrode 11 and the row of the second electrode 12 are connected to the pad electrode 40 through a routing line 25.

The rows of the first electrodes 11 cross rows of the second electrodes 12 in the form of bars. Alternatively, as illustrated in the drawings, the rows of the first and second electrodes 11 and 12 are in the form of diamond patterns in respective sensing regions, the second electrodes 12 are formed such that they have a thin connection pattern integrated with adjacent diamond patterns, and the first electrodes 11 are electrically connected through a connection metal pattern 21 of adjacent diamond pattern and metal in the different layer with respect to the interconnection pattern.

The touch controller 51 is a form of integrated circuit (IC), which is provided at one side with input pins as connection portions to an operating portion of a display device and at the other side with output pins (not shown, which contacts the pad electrode 40) to apply signals to the first and second electrodes 11 and 12.

Respective ends of the rows of the first electrode 11 and rows of the second electrode 12 are connected to the routing line 25 and thus connected to the pad electrodes 40.

In FIG. 1, both ends of the first electrode 11 are connected to the routing line 25. This configuration is designed so that both ends of the first electrode 11 can receive signals in order to reduce differences in RC delay between both ends thereof. In some instances, the routing line may be connected to only one end of the first electrode 11.

For a conventional touch panel in all of these instances, at least one routing line is connected to each of the first electrode 11 and the second electrode 12.

Meanwhile, as shown in FIG. 2, in recently mass-produced touch panels, diamond patterns constituting the first electrodes 11 and the second electrodes 12 have a diagonal line of 6 to 10 mm, and the distance between the first electrode 11 and the second electrode 12 adjacent to each other is 300 μm or greater.

FIG. 3 is a view illustrating failure caused by multi-touch of a conventional touch panel.

A conventional touch panel is touched by an input means such as the finger. The surface of the touch panel is rapidly touched several times by the finger in an oval or circular motion and whether or not the touch is sensed is confirmed. As a result, the drawn lines are partially interrupted, as shown in FIG. 3. In addition, a ghost error wherein a region not touched by the finger is detected, when different regions are touched, occurs.

Such a failure is due to small variations in capacitance before and after touch and the reasons therefor are as follows.

The capacitive touch panel of FIGS. 1 and 2 detects the presence of touch by setting a predetermined threshold electric charge to a system and deciding a region having an electric charge exceeding the set value to be touched.

In this instance, a fringe field is generated between the first and second electrodes 11 and 12 spaced from each other and the finger varies the fringe field present therebetween. Practically, an initial fringe field is greatly varied, when an area provided between the first and second electrodes 11 and 12 is touched, whereas an electric charge does not exceed the threshold electric charge due to slight variation in initial fringe field and thus small variation in electric charge before and after touch, when the center of the first electrode 11 or the second electrode 12 is touched. As a result, interruption of touch occurs.

In addition, variations in electric charge before and after touch are great at the center of the first electrode 11 and the second electrode 12, and touch sensitivity is improved with increasing proximity to the center of a touched position. However, a region touched by the finger may be 10 mm or smaller and touch sensitivity thereof is thus deteriorated, as a touched portion becomes farther from the center of the first electrode 11 and the second electrode 12 (closer to the center thereof). In particular, relative touch sensitivity of a predetermined region is deteriorated and detection of touch is impossible in a portion of region where the electrodes are formed.

In addition, ghost phenomenon may occur due to malfunction of touch detection upon multi-touch and the reason therefor is considered to be deterioration in touch sensitivity.

Such conventional touch panel has the following problems.

The conventional touch panel comprises a plurality of first and second electrodes crossing each other, and compares variation in electric charge induced by a fringe field between the first electrode and the second electrode with a threshold electric charge set in a system, to detect presence of touch.

In this instance, when a critical value of the first electrode and the second electrode is high, as compared to a contact area of the finger, touch sensitivity is deteriorated with increasing proximity to the center of the electrode. At this time, touch cannot be detected due to an electric charge lower than a threshold electric charge at the center of electrodes upon touch. This is observed as breakdown or ghost upon multi-touch.

In some instances, in order to increase variations in fringe field between the first and second electrodes before and after touch, an insulating film with a predetermined thickness or greater may be further provided between the panel surface on which the finger contacts the first and second electrodes. However, formation of the insulating film requires a material and mask process, thus disadvantageously causing inconvenience due to increased cost and variation of apparatus to install the touch panel.

SUMMARY OF THE INVENTION

Accordingly, the present invention is directed to a touch panel and a method for fabricating the same that substantially obviate one or more problems due to limitations and disadvantages of the related art.

It is one object of the present invention to provide a touch panel wherein cells to perform sensing operation are partitioned into a plurality of portions and a plurality of electrodes are divided in the portions, and the electrodes are connected to each other through one routing line to improve touch sensitivity, and a method for fabricating the same.

To achieve these objects and other advantages and in accordance with the purpose of the invention, as embodied and broadly described herein, provided is a touch panel includinga plurality of first electrode patterns being serially connected by a plurality of first connection patterns; a plurality of second electode patterns being serially connected by a plurality of second connection patterns; and a plurality of routing lines; wherein at least two of the plurality of first electrode patterns are connected to at least one of the plurality of routing lines.

In an embodiment of the invention, a touch panel includes a plurality of first electrode patterns being serially connected by a plurality of first connection patterns; a plurality of second electode patterns being serially connected by a plurality of second connection patterns; a plurality of routing lines; and a plurality of connection parts, wherein at least two of the plurality of first electrode patterns are connected to one of the plurality of connection parts, and at least one of the plurality of routing lines is electrically connected to the one of the plurality of connection parts.

In an embodiment of the invention, a touch panel includes a plurality of first electrode serials including a first series of a plurality of first electrodes serially connected by a plurality of first connection patterns and a second series of a plurality of first electrodes serially connected by a plurality of first connection patterns; and at least one redundancy pattern, wherein an electrode of the first series is connected to an electrode of the second series by the at least one redundancy pattern.

In an embodiment of the invention, a touch panel includes a plurality of first electrode serials including a first series of a plurality of first electrodes serially connected by a plurality of first connection patterns, and a second series of a plurality of first electrodes serially connected by a plurality of first connection patterns; a plurality of second electrode serials including a third series of a plurality of second electrodes serially connected by a plurality of second connection patterns, and a fourth series of a plurality of second electrodes serially connected by a plurality of second connection patterns; at least one first redundancy pattern; and at least one second redundancy pattern, wherein an electrode of the first series is connected to an electrode of the second series by the at least one first redundancy pattern, and an electrode of the third series is connected to an electrode of the fourth series by the at least one second redundancy pattern.

In an embodiment of the invention, a touch panel includes a substrate, a plurality of first electrode serials including a first series of a plurality of first electrodes serially connected by a plurality of first connection patterns, and a second series of a plurality of first electrodes serially connected by a plurality of first connection patterns; a plurality of second electrode serials including a third series of a plurality of second electrodes serially connected by a plurality of second connection patterns, and a fourth series of a plurality of second electrodes serially connected by a plurality of second connection patterns; at least one first redundancy pattern; at least one second redundancy pattern; a plurality of first routing lines; a plurality of second routing lines; a plurality of first connection parts; and a plurality of second connection parts, wherein the first series and the second series are electrically connected to one of the plurality of first connection parts, the third series and the fourth series are electrically connected to one of the plurality of second connection parts, at least one of the plurality of first routing lines is connected to the one of the plurality of first connection parts; at least one of the plurality of second routing lines is connected to the one of the plurality of second connection parts, an electrode of the first series is connected to an electrode of the second series by the at least one first redundancy pattern, and an electrode of the third series is connected to an electrode of the fourth series by the at least one second redundancy pattern.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Hereinafter, a touch panel and a method for fabricating the same according to the present invention will be described with reference to the annexed drawing in detail.

For the touch panel in accordance with the present invention, conventional unit cells performing capacitive-type sensing are divided into a plurality of electrodes having an area smaller than an area touched by an input means and application and sensing of scan signals are performed at each unit cell.

Based on such a configuration, both areas provided between adjacent spaced electrodes and the centers of the electrodes are included in one touch portion of an input means without increasing application of scan signals, thus improving touch sensitivity.

That is, partitioning a plurality of electrodes into each unit cell causes generation of a high initial fringe field between adjacent electrodes and great variation in capacitance when touched by an input means such as the finger, thus exhibiting considerably improved touch sensitivity, as compared to a conventional structure wherein one sensing electrode is present at each unit cell.

In this instance, although the size of each unit cell increases in a large panel, the unit cell is partitioned and touch sensitivity can thus be improved. Groups of n electrodes arranged in a first direction are connected through a routing line, and the number of routing lines required for application of scan signals is thus uniform, thus requiring no additional routing line, and eliminating the necessity of increasing a non-display region, as compared to a structure wherein one electrode is present in one sensing region. As a result, a narrow bezel can be realized. By dividing the unit cells, touch sensitivity of unit cells can be improved, thus requiring no increase of a non-display region for routing lines required for application of scan signals. As a result, a narrow bezel can be realized.

In the following embodiments, each unit cell has a size of one conventional sensing region, and the sensing region is divided into at least four portions and electrodes are spaced from one another in the divided portion.

Hereinafter, a touch panel and a method for fabricating the same will be described in detail according to preferred embodiments.

* First Embodiment of Device *

Figure 1:
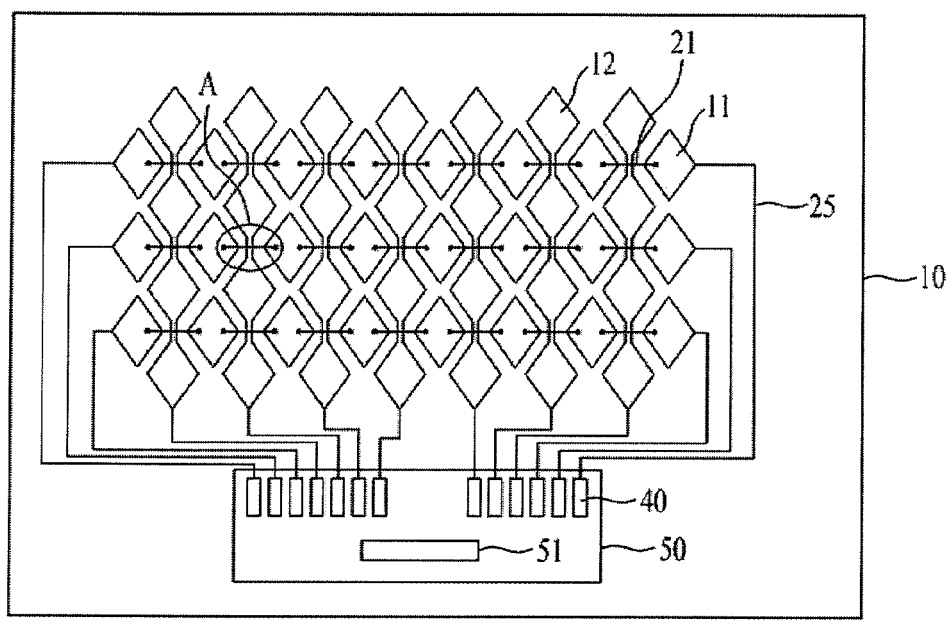
FIG. 1 is a plan view illustrating a conventional touch panel.
Figure 2:
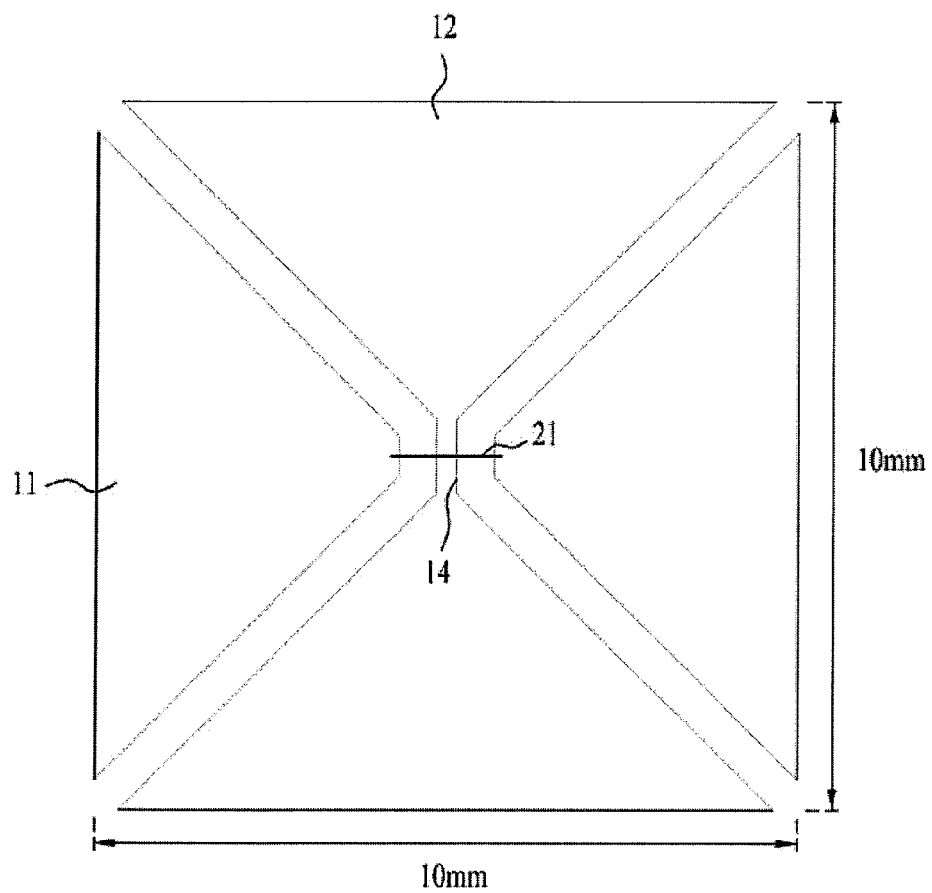
FIG. 2 is an enlarged view of the region A of FIG. 1.
Figure 3:
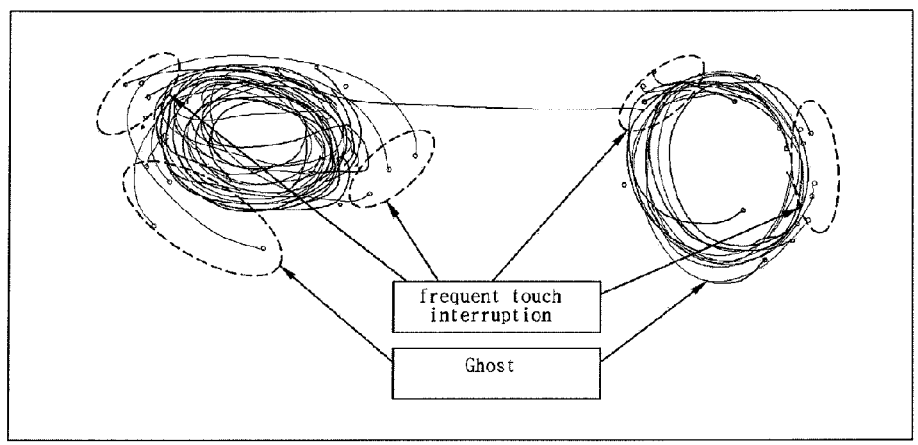
FIG. 3 is a view illustrating failure caused by multi-touch of a conventional touch panel.
Figure 4:
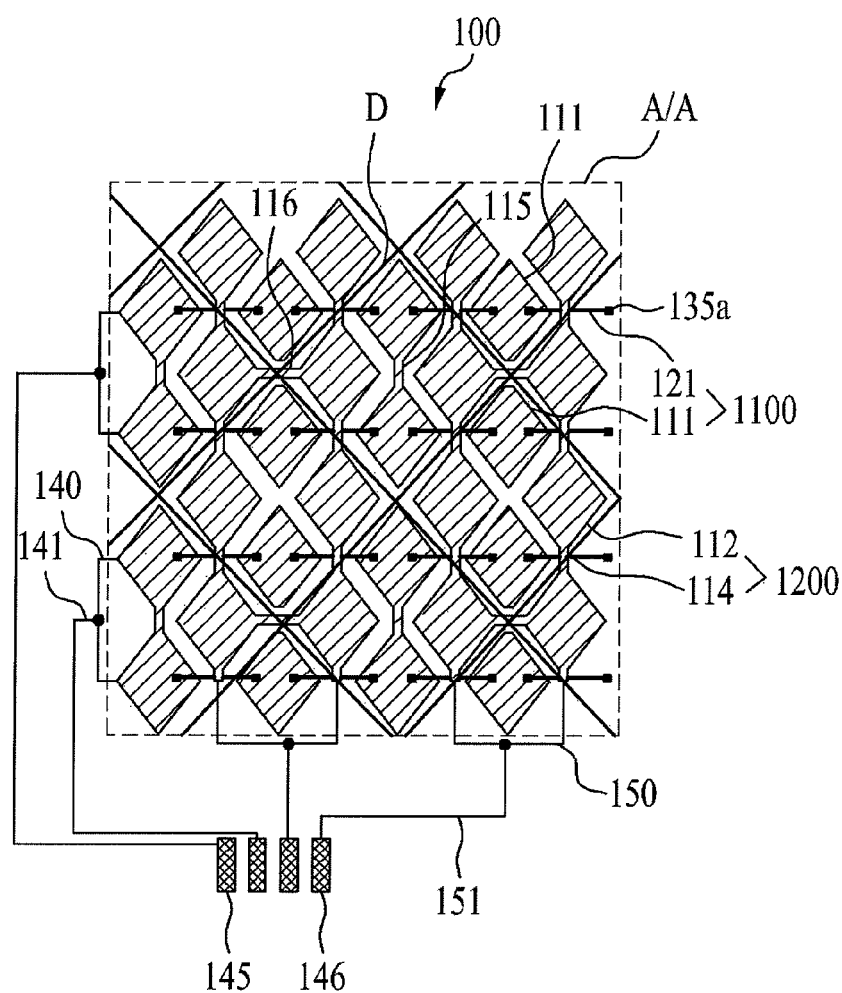
FIG. 4 is a plan view illustrating a touch panel according to a first embodiment.
Figure 5A:
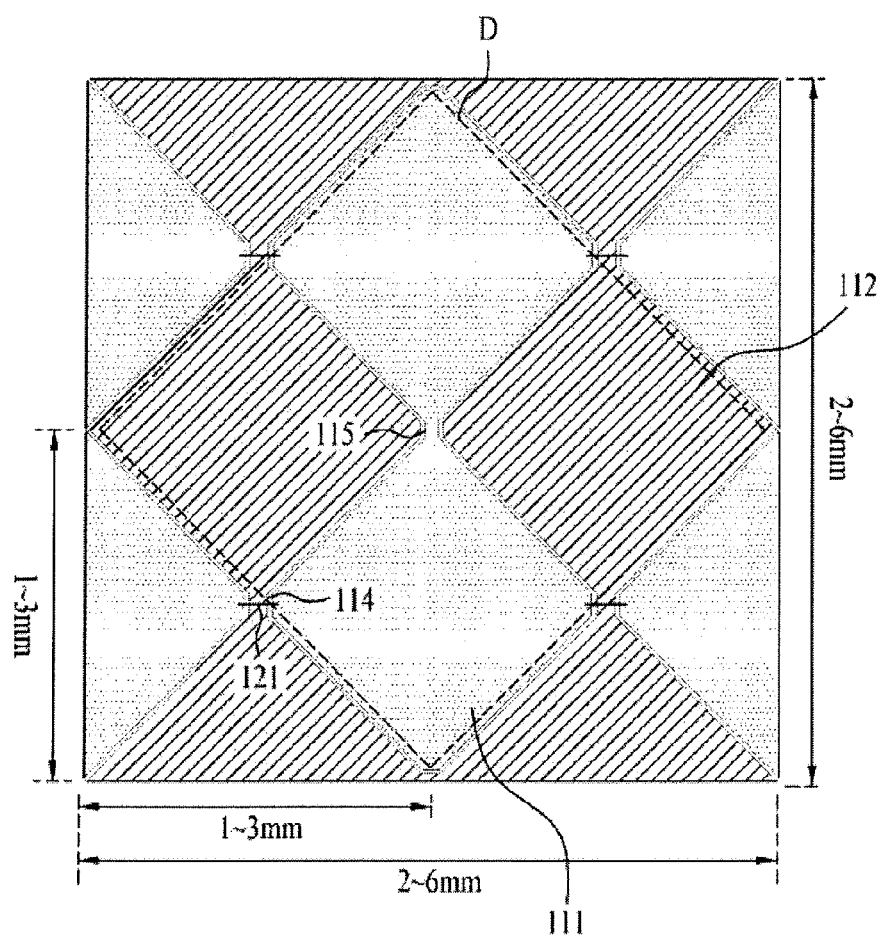
FIG. 5A is a plan view illustrating a unit cell and a region adjacent thereto and FIG. 5B is a plan view illustrating correspondence of a routing line to the unit cell.
Figure 5B:
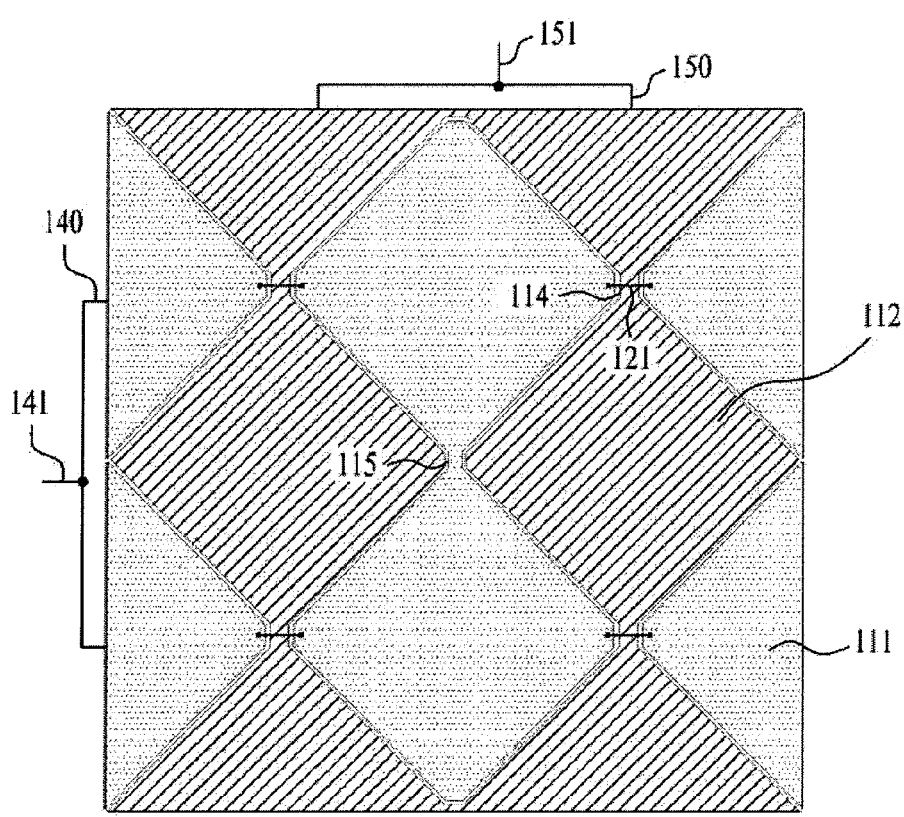

FIG. 4 is a plan view illustrating a touch panel according to a first embodiment. FIG. 5A is a plan view illustrating a unit cell of FIG. 4 and a region adjacent thereto. FIG. 5B is a plan view illustrating correspondence of a routing line to the unit cell.

The touch panel according to the first embodiment, as shown in FIGS. 4 to 5B, includes a plurality of first sensors 1100 arranged in a second direction on the substrate 100, wherein the first sensors (or first electrode serials) 1100 include a plurality of first electrodes (or first electrode patterns) 111 spaced from one another on a substrate 100 in a first direction and a plurality of first bridge patterns (or first connection patterns) 121 to connect the two adjacent first electrodes 111; a plurality of second sensors (or second electrode serials) 1200 arranged in a first direction, wherein the second sensors include a plurality of second electrodes (or second electrode patterns) 112 spaced from one another in a second direction and a plurality of second bridge patterns (or second connection patterns) 114 to connect two adjacent second electrodes 112; a first routing line 141 connected to the end of the adjacent n (wherein n is an integer of 2 or higher) first electrodes; and a second routing line 151 connected to the end of the adjacent m (wherein m is an integer of 2 or higher) second sensors.

The first and second directions cross each other, and may be X and Y axes, respectively, or vice versa, as illustrated in the drawing.

In addition, the first electrodes 111 and the second electrodes 112 are located in different positions, and each first bridge pattern 121 and each second bridge pattern 114 cross each other.

The substrate 100 includes an active region (A/A) in which display and touch operations are realized at the center and a non-display region at the periphery.

The active region (A/A) includes a plurality of unit cells arranged in the form of a matrix and is connected to one end of the first routing line 141 and one end of the second routing line 151 at the interface between the active region (the outermost matrix of the unit cells) and the non-display region. At respective unit cells, the active region is connected to different first routing lines 141 and different second routing lines 151.

In addition, the other end of the first routing line 141 and the other end of the second routing line 151 are connected to pad electrodes 145 and 146, respectively, arranged at one side of the non-display region.

The pad electrodes 145 and 146 are bonded to a flexible printed circuit (FPC) including a touch controller to receive electrical signals from the external touch controller and transfer sensing signals.

An example wherein the number (n) of the first sensors 1100 connected to one first routing line 141 is 2 and the number (m) of second sensors 1200 connected to one second routing line 151 is 2 is illustrated in the drawing. In some instances, n and m may be an integer of 3 or higher, and may be identical or different.

Each unit cell includes n (in which n is an integer of 2 or higher) first electrodes 111 grouped by one routing line and m (in which m is an integer of 2 or higher) second electrodes 112 grouped by one routing line. In this instance, fringe field capacitance is generated, depending on the product of the initial numbers (i.e., n and m) of the first and second electrodes 111 and 112 at each unit cell.

An initial capacitance is generated by at least four fringe fields between adjacent first and second electrodes 111 and 112 at each unit cell. In addition, when touched by an input means such as the finger or pen, a touched region is formed such that it covers at least two regions where capacitance is generated and variations in capacitance upon touch are thus great. Accordingly, variations in capacitance are great, as compared to a conventional structure wherein one sensing electrode is arranged at each unit cell, thus improving touch sensitivity.

In addition, an area of one touch portion is secured such that the touch portion completely covers the first electrode 111 or the second electrode 112, thus avoiding deterioration in touch sensitivity in an area where the electrode 111 or 112 is formed. Accordingly, uniformity of touch sensitivity is improved. As a result, variations in capacitance by a sufficient fringe field even upon multi-touch can be obtained and ghost error can thus be prevented.

Meanwhile, at least one first redundancy pattern 115 to connect adjacent first sensors 1100 may be present between the first sensors 1100 connected to the first routing line 141. The first redundancy pattern 115 is integrated with the first electrode 111 and is arranged in the second direction.

In addition, at least one second redundancy pattern 116 to connect adjacent second sensors 1200 may be present between the second sensors 1200 connected to the second routing line 151. The second redundancy pattern 116 is integrated with the second electrode 112 and is arranged in the first direction.

Both or one of the first redundancy pattern 115 and the second redundancy pattern 116 may be formed. In addition, the first redundancy pattern 115 may be formed in at least one of the adjacent first sensors 1100 and may be formed in a partial or entire portion of the first routing line 141 at all unit cells.

Similarly, the second redundancy pattern 116 may be formed in at least one of the second sensors 1200.

The first redundancy pattern 115 and the second redundancy pattern 116 are connected such that the first and second redundancy patterns 115 and 116 cross the first electrode 111 and second electrodes 112, respectively. In this instance, when one first electrode 111 opens in each cell due to a factor such as static electricity, signals are transferred to another first electrode 111 connected through the first redundancy pattern 115, thus preventing line failure in the corresponding first sensor 1100 in which static electricity is generated. Accordingly, touch in the corresponding first sensor 1100 in which static electricity is generated can be efficiently detected. The second redundancy pattern 116 has similar functions to the first redundancy pattern 115.

In addition, the first and second redundancy patterns 115 and 116 enable signals to be rerouted upon generation of static electricity and reinforce electrical connection between adjacent first sensors 1100 and between adjacent second sensors 1200, to which identical signals are applied, thus advantageously reducing RC delay.

If appropriate, among the first sensors 1100 and the second sensors 1200, the sensor having a longer side may include more redundancy patterns.

Meanwhile, the afore-mentioned first and second redundancy patterns are further formed in the first sensors or second sensors at the divided unit cells, to prevent static electricity and signal delay, and may be omitted, if appropriate.

As mentioned above, the fractioned first electrodes 111 and second electrodes 112 have a critical size (the longest length of the electrode, i.e., a diagonal line length in the drawing) is about 0.5 mm to about 5.5 mm. More preferably, the first electrodes and second electrodes have a size of about 1 mm to about 3 mm. The size of the first and second electrodes 111 and 112 is designed such that it is smaller than a size of an area touched by an input means.

In addition, the adjacent first electrode 111 and second electrode 112 are spaced by a distance of about 10 μm to about 30 μm.

The distance between the adjacent redundancy patterns 115 or 116 and the distance between the adjacent electrodes 111 and 112 are also in the range of about 10 μm to about 30 μm.

In addition, the first electrodes 111 and the second electrodes 112 are transparent electrodes and are formed in the same layer by patterning the transparent electrodes. In this instance, the transparent electrode may be composed of at least one of indium tin oxide (ITO), indium zinc oxide (IZO), antimony zinc oxide (AZO), ZnO and $SnO_2$. Alternatively, the electrodes may be composed of a laminate including a combination thereof.

In addition, the second bridge pattern 114 to connect the second electrodes 112 is integrated with the second electrodes 112 in the same layer as the transparent electrodes. In this instance, the second bridge pattern 114 including the transparent electrodes may have a width of about 10 μm to about 500 μm.

The first bridge pattern 121 may be composed of a metal, or the first bridge pattern or the second bridge pattern may include a laminate including a metal and a transparent electrode.

At this time, the first bridge pattern 121 has a width of 3 to 20 μm. In this instance, the upper limit, 20 μm, refers to an invisible maximum width, and the lower limit, 3 μm, refers to a minimum width which can be realized with a pattern. The lower limit may be decreased, when resolution is improved in future techniques. The first bridge pattern 121 has a length to connect spaced adjacent first electrodes 111.

In addition, the first bridge pattern 121 is composed of a metal selected from molybdenum (Mo), copper (Cu), silver (Ag), chromium (Cr), aluminum (Al), aluminum neodymium (AlNd), molybdenum titanium (MoTi) and a combination thereof, or a laminate including a combination thereof.

In addition, a first insulating film (represented by reference numeral "135" in FIG. 9C) may be further present between the metal constituting the first bridge pattern 121 and the first and second electrodes 111 and 112.

The first insulating film 135 includes one selected from a nitride film ($SiN_x$) an oxide film ($SiO_x$) and a nitride oxide film ($SiN_xO_y$) and an organic thin film having a thickness of about 0.1 μm to about 1 μm. The organic thin film, for example, may be composed of a variety of resins including a photoacrylic resin, an epoxy resin and the like.

In this instance, when the first bridge pattern 121 is formed on the substrate 100, the first and second electrodes 111 and 112 are formed on the insulating film 135.

Alternatively, after the first and second electrodes 111 and 112 are formed, the metal constituting the first bridge pattern 121 may be formed on the insulating film 135.

The first routing line 141 and the second routing line 151 are formed with the same metal in the same layer as the metal constituting the first bridge pattern 121.

The first electrodes 111 and the second electrodes 112 may be in the form of a polygon or circle. It is preferred that the first electrodes and the second electrodes have a polygonal shape having sides with identical lengths in that an area of the substrate can be optimized and location of the electrodes is advantageous.

Although the shape of the first and second electrodes 111 and 112) is a rhombus with identical lengths in the aforementioned embodiments, it is not limited thereto and may be selected from various polygons or circles.

In addition, a second insulating film may be further present on the substrate including the first and second electrodes. In this instance, the second insulating film may be selected from a nitride film, an oxide film, a nitride oxide film (SiNxOy) and an organic thin film with a thickness of about 0.1 µm to about 1 µm. For example, the organic thin film may be selected from various resins including photoacrylic resins, epoxy resins and the like.

In this instance, the second insulating film (represented by reference numeral "245" of FIG. 17D) contributes to visibility and sensitivity. However, formation of the second insulating film 245 further requires a mask process to expose the pad electrodes 145 and 146, and formation of the second insulating film 245 is decided by taking into consideration visibility, sensitivity, and process advantages in view of advantages obtained by omission.

Meanwhile, a polarization plate acting as an insulating film may be further present on the substrate including the first electrodes 111 and the second electrodes 112. In this instance, the polarization plate preferably has a thickness of about 135 µm to about 270 µm.

For the touch panel of the present invention, initial fringe capacitance between adjacent first and second electrodes can be increased by partitioning each unit cell into at least four portions, and the thickness of a polarization plate acting as a separate insulating film can be minimized by increasing variations in capacitance upon touch.

Preferably, the first electrodes 111 and the second electrode 112 have an area smaller than an area of one portion touched by an input means, and at least one of the first electrode 111 and the second electrode 112 is present in two or more in number in one portion touched by the input means.

Variations in capacitance by the fringe field between the first and second electrodes in one portion touched by an input means are greater than variations in capacitance in the instance of a single first or second electrode.

Meanwhile, as illustrated, a first connection portion (represented by reference numeral "117" in FIG. 11D) formed in the same layer with the same material as the transparent electrodes may be further present between the first routing line 141 and ends of the n (n is an integer of 2 or higher) adjacent first sensors 1100. In addition, a second connection portion (represented by reference numeral "118" in FIG. 11D) formed in the same layer with a same material as the transparent electrodes may be further present between the second routing line 142 and ends of the m (wherein m is an integer of 2 or higher) adjacent second sensors 1200. In this instance, the first connection portion 117 is formed by sharing n first sensors 1100 in the second direction and the second connection portion 118 is formed by sharing the m second sensors 1200 in the first direction. In this instance, the first and second connection portions 117 and 118 composed of transparent electrodes may be located in the active region and have a contact hole 135b on the interface between the active region and the non-display region.

\* Second Embodiment of Device \*

Figure 6:
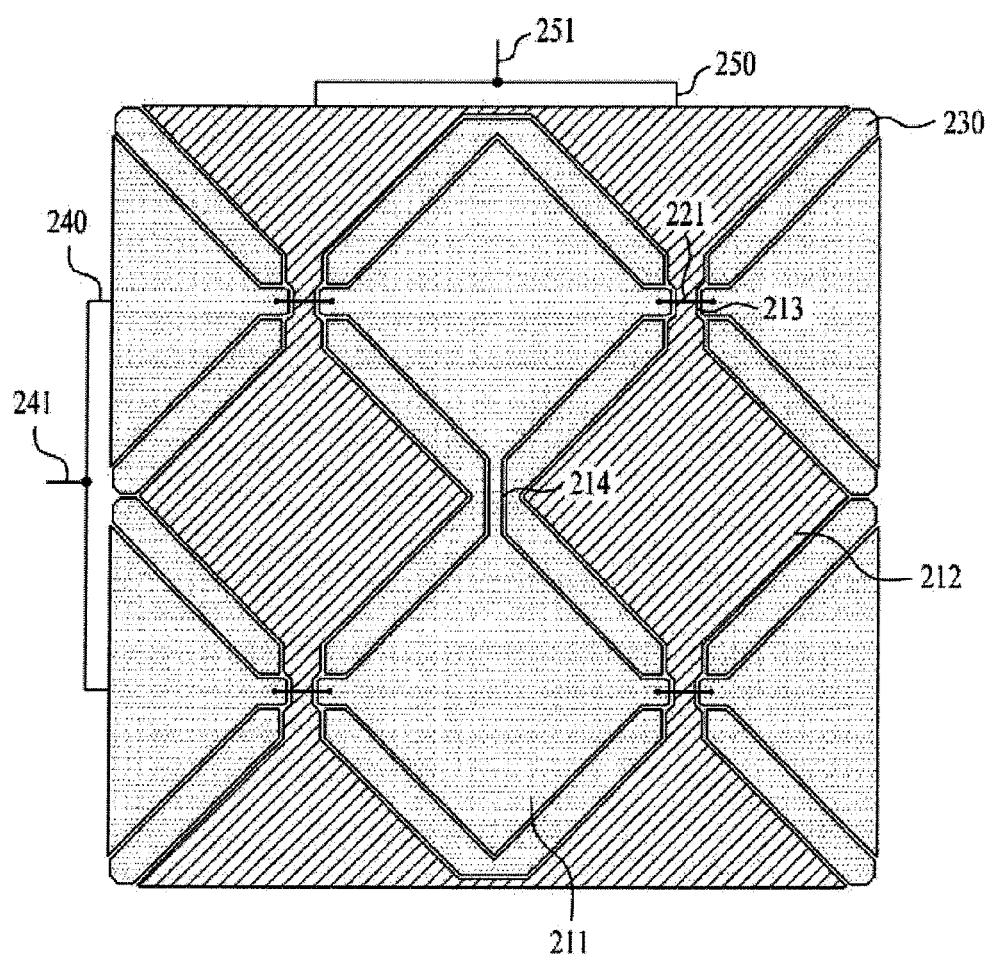
FIG. 6 is a plan view illustrating a touch panel according to a second embodiment of the present invention.

FIG. 6 is a plan view illustrating a touch panel according to a second embodiment of the present invention.

As shown in FIG. 6, the touch panel according to the second embodiment further comprises a dummy pattern 230 between the first electrode 211 and the second electrode 212 adjacent to each other. In this instance, the dummy pattern 230 has a width of about 10 µm to about 240 µm, and the distance between the first electrode 211 and the dummy pattern 230, and the distance between the second electrode 212 and the dummy pattern 230 are about 10 µm to about 30 m.

The dummy pattern 230 floats and is not connected to a routing line, which is further provided to prevent observation of patterns caused by the location of spaced first and second electrodes 211 and 212 on the intersection between the first and second electrodes 211 and 212. In this instance, the dummy pattern 230 is composed of the same material (i.e., transparent electrode material) as the first and second electrodes 211 and 212, and the second bridge pattern 213. The distance of about 10 µm to about 30 µm between the dummy pattern 230 and the first or second electrode 211 and 212 adjacent thereto prevents observation of patterns of the first and second electrodes 211 and 212, and deterioration in capacitance sensing.

The reason for presence of the dummy pattern 230 is as follows. For example, when reflection on the surface of a touch panel formed at various angles toward the panel is tested, in the instance where the first and second electrodes 211 and 212 are spaced from each other by a predetermined width or higher, reflection may occur on the external surface. In addition, when the first and second electrodes 211 and 212 are considerably close to each other, diffraction occurs on the interface therebetween, thus causing exposure of interfaces. For this reason, the dummy pattern 230 is designed to be in a floating state without applying any electric signals in order to prevent exposure of patterns of the first and second electrodes 211 and 212.

Reference numeral 214 not described herein in detail refers to a first redundancy pattern, reference numerals 241 and 251 mean a first routing line connected to two first electrodes 211 and a second routing line connected to two second electrodes 212, respectively.

In addition, reference numeral 240 is a connection portion to connect the first routing line to the two first electrodes 211, and reference numeral 250 is a connection portion to connect the second routing line and the two second electrodes 212.

Elements not described are defined as in the first embodiment.

\* Third and Fourth Embodiments of Device \*

Routing conditions are not limited to two as illustrated above. That is, groups of three or more first sensors and second sensors 1100 and 1200 may correspond to a routing line.

Figure 7A:
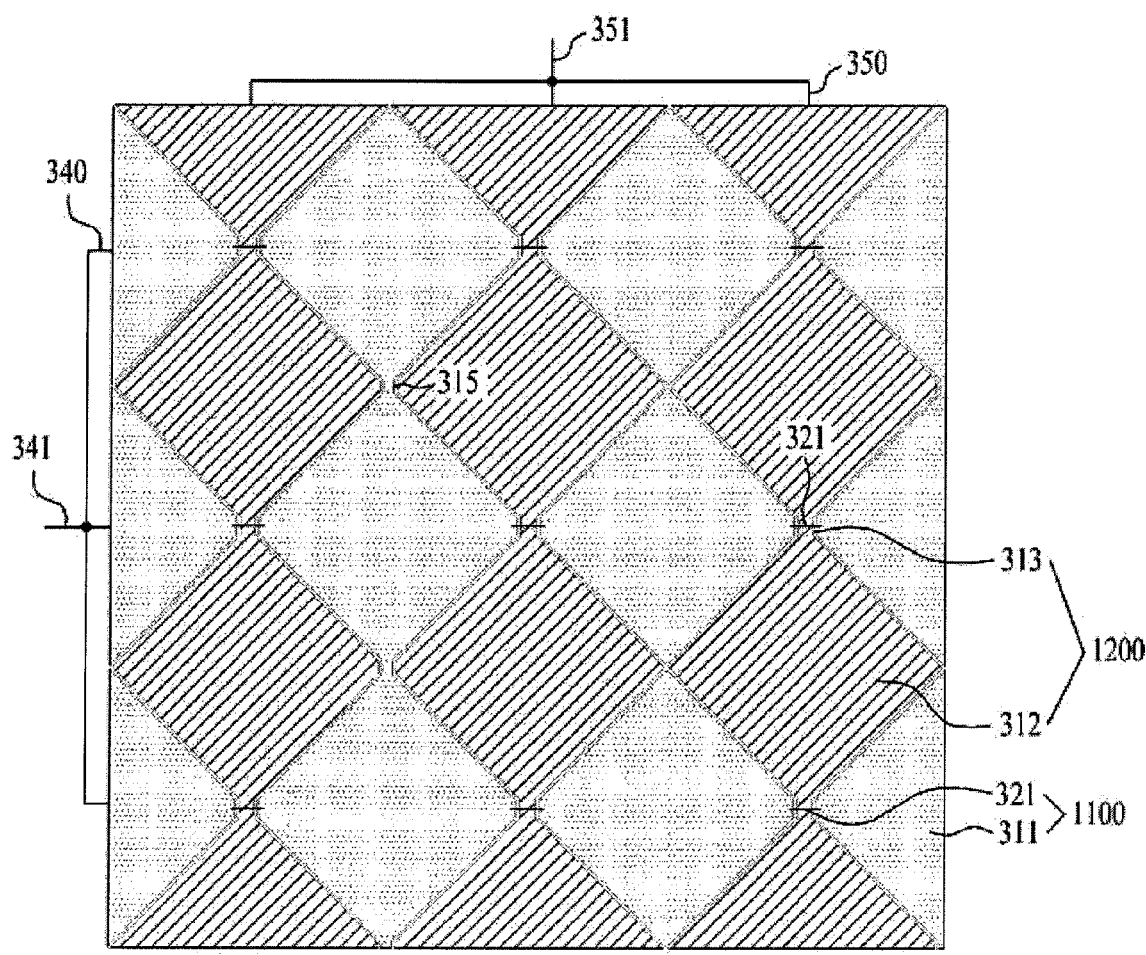
FIGS. 7A and 7B are plan views illustrating a touch panel according to a third and fourth embodiment of the present invention.
Figure 7B:
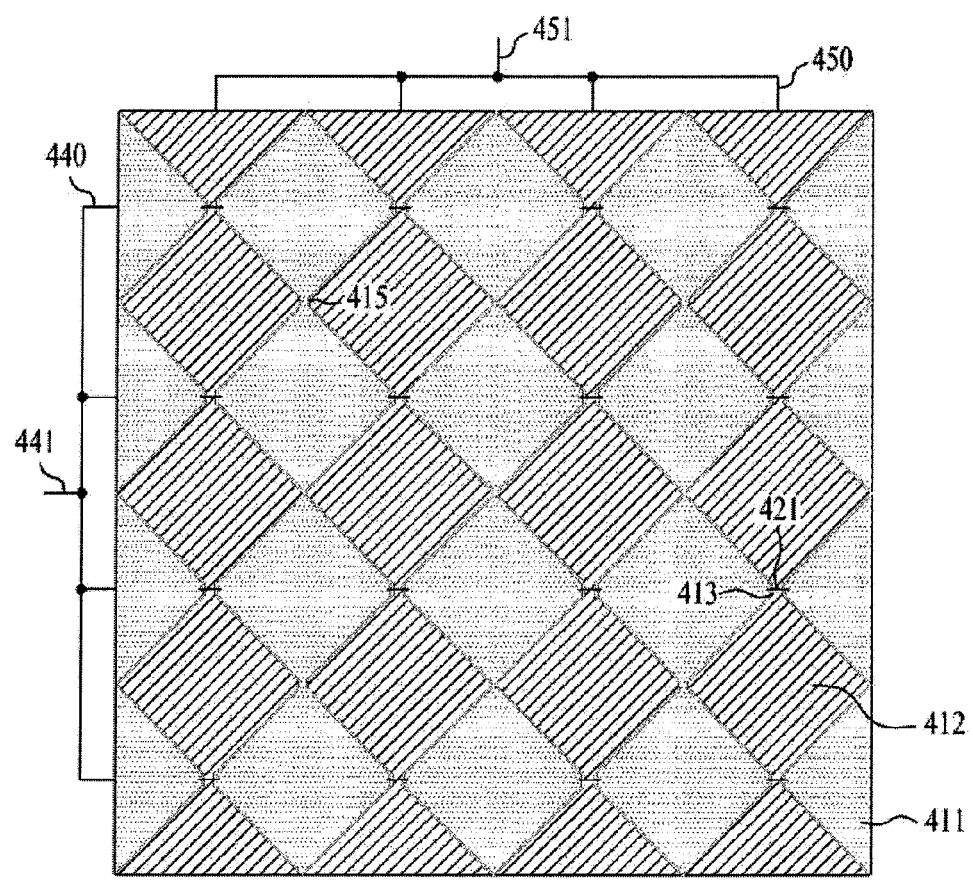

FIG. 7A is a plan view illustrating a touch panel according to a third embodiment of the present invention. FIG. 7B is a plan view illustrating a touch panel according to a fourth embodiment of the present invention.

As shown in FIG. 7A, for the touch panel according to the third embodiment, three adjacent first electrodes 311 arranged in a second direction (Y axis direction) share one first routing line 341 and three adjacent second electrodes 312 arranged in a first direction (X axis direction) share one second routing line 351.

The first electrodes 311 and the second electrodes 312 are provided at one end thereof with a first shared portion 340 and a second shared portion 350 such that these electrodes share the first routing line 341 and the second routing line 342 with other adjacent electrodes.

Reference numeral "321" not described herein in detail refers to a first bridge pattern and reference numerals "213" and "315" are a second bridge pattern and a first redundancy pattern, respectively.

As illustrated in the drawings, the first redundancy pattern 315 may be present at each cell which shares the first routing line 341 or may be present in each area between adjacent first electrodes 311 arranged in the second direction. In this instance, the first redundancy pattern 315 may be integrated with the first electrode 311.

At least one second redundancy pattern may be present at each cell which shares the second routing line 351 in other embodiments.

As shown in FIG. 7B, for the touch panel according to the fourth embodiment, four adjacent first electrodes 411 arranged in a second direction (Y axis direction) share one first routing line 441 and four adjacent second electrodes 412 arranged in a first direction (X axis direction) share one second routing line 451.

The first electrodes 411 and the second electrodes 412 are provided at one end thereof with a first shared portion 440 and a second shared portion 450 such that these electrodes share the first routing line 441 and the second routing line 451 with adjacent other electrodes.

Reference numeral "421" not described herein in detail refers to a first bridge pattern and reference numerals "413" and "415" are a second bridge pattern and a first redundancy pattern, respectively.

As such, the touch panel is not limited to the afore-mentioned two or four shared routing conditions in one direction, but the number (n) of the first sensors 1100 connected to one first routing line may be an integer of 2 or higher, and the number (m) of second sensors 1200 connected to one second routing line may be an integer of 2 or higher. In this instance, the size of first and second electrodes present at each unit cell satisfies the afore-mentioned critical size conditions.

Accordingly, n (wherein n is an integer of 2 or higher) first electrodes and m (wherein m is an integer of 2 or higher) second electrodes grouped by the respective routing line are present at each unit cell. In this instance, capacitance in fringe field is generated and an initial capacitance is thus great, depending on the product of the initial numbers (i.e., n and m) of the first and second electrodes 111 and 112 at each unit cell. In addition, variations in capacitance upon touch are great, thus improving touch sensitivity. Accordingly, electric charges in all touched regions exceed the threshold electric charge set in a system, and thus exhibiting improved touch sensitivity, as compared to a conventional structure wherein one sensing electrode is arranged at each unit cell.

* Modified Device Embodiment *

Figure 8A:
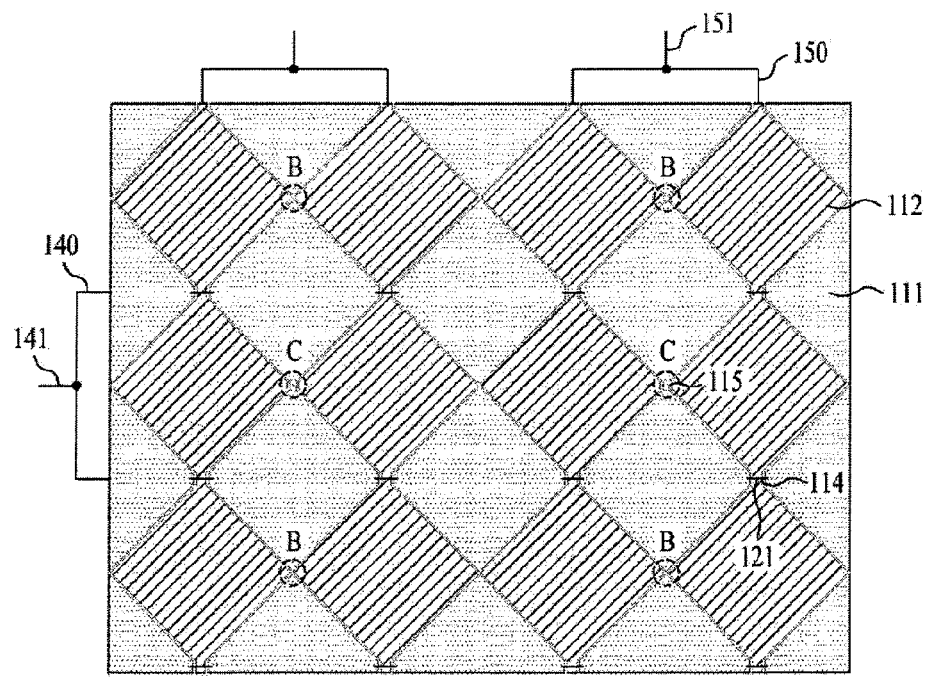
FIGS. 8A and 8B are plan views illustrating a first embodiment and a modified embodiment thereof.
Figure 8B:
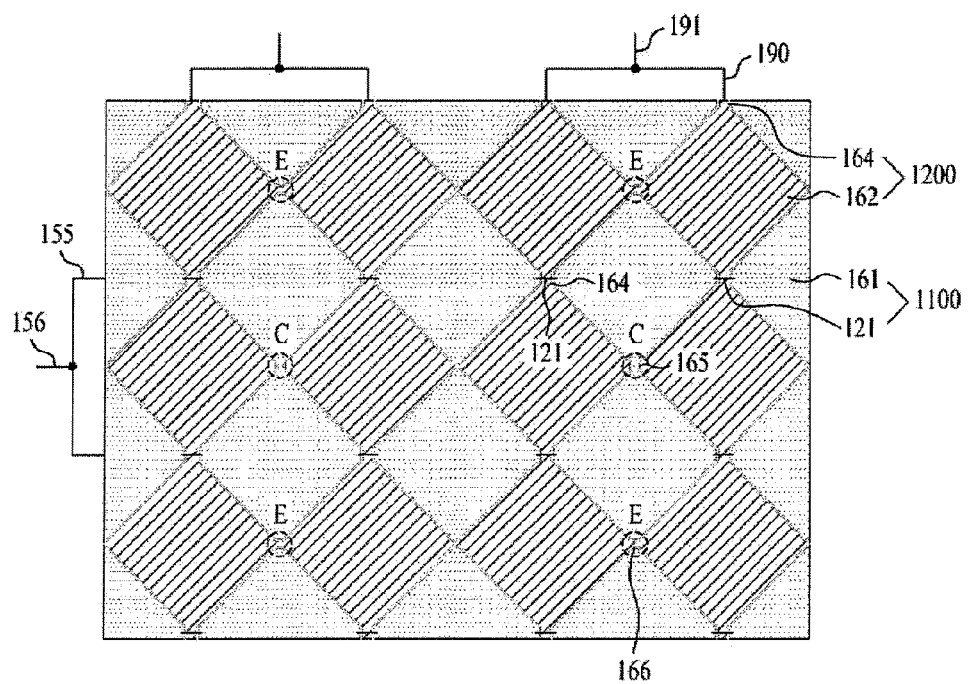

FIGS. 8A and 8B are plan views illustrating the first embodiment and a modified embodiment thereof.

FIG. 8A illustrates a first embodiment comprising only the first redundancy pattern 115 (region C) and FIG. 8B illustrates an example including the first redundancy pattern 165 (region C) and the second redundancy pattern 166 (region E) provided between adjacent second electrodes 162 of the second sensor 1200 connected through the second routing line 151.

The first redundancy pattern 165 and the second redundancy pattern 166 present with respect to one sharing routing line may be one or more in number and may be formed in a partial or entire portion.

In FIG. 8A, the region B is a portion where no redundancy pattern is formed, and FIG. 8A illustrates an example wherein a redundancy pattern is selectively present. In FIG. 8B, the first redundancy pattern 165 (region C) or the second redundancy pattern 166 (region E) is formed in an entire portion, the first and second redundancy patterns 165 and 166 connect the first electrodes 161 of adjacent first sensors 1100, and the second electrodes 162 of adjacent second sensors 1200, respectively.

* First Embodiment of Fabrication Method *

FIGS. 9A to 9D are sectional views illustrating a method for fabricating a touch panel according to a first embodiment of the present invention. FIGS. 10A to 10D are plan views illustrating a method for fabricating a touch panel according to a first embodiment of the present invention.

The method for fabricating the touch panel according to the first embodiment will be described in detail.

First, a substrate 100, wherein a plurality of cells in the form of matrixes is defined, is prepared.

The substrate 100 includes an active region A/A provided with the cells and a non-display region at a periphery in which the first and second routing lines and pad electrodes are formed.

Figure 9A:
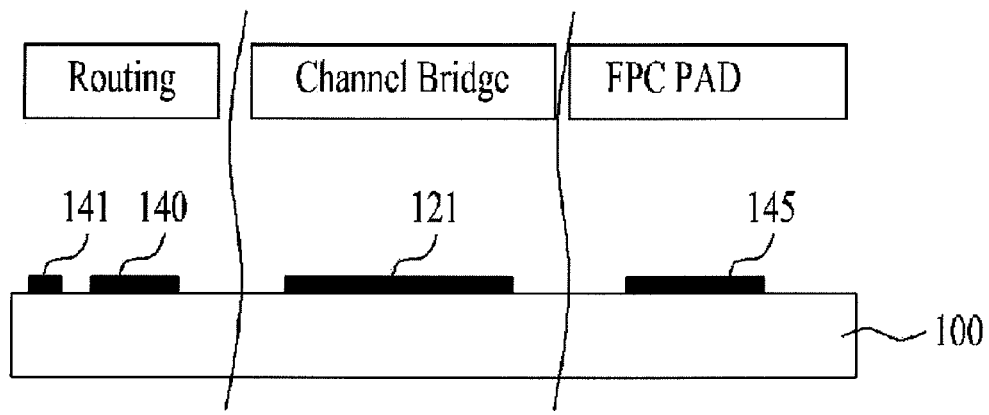
FIGS. 9A to 9D are sectional views illustrating a method for fabricating a touch panel according to the first embodiment.
Figure 10A:
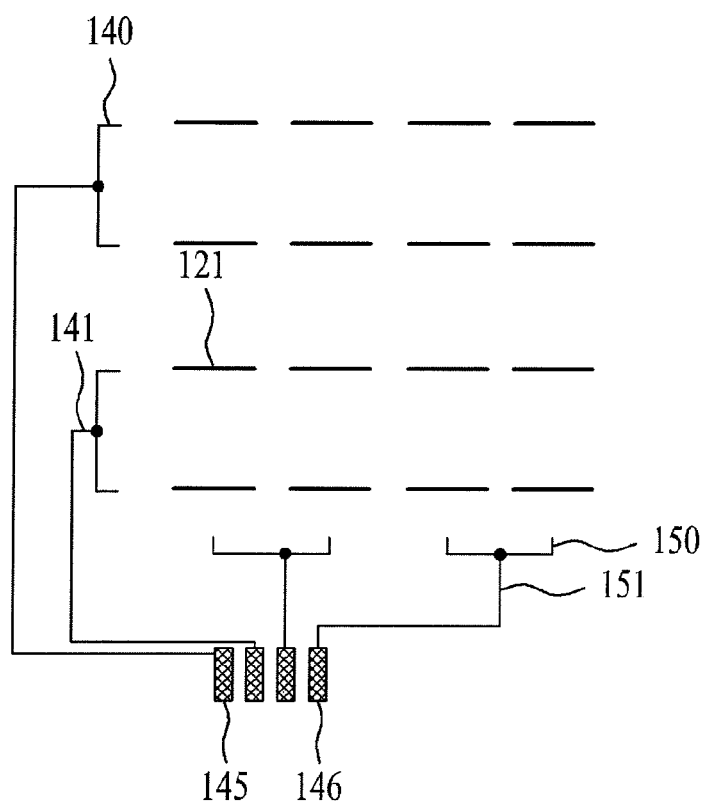
FIGS. 10A to 10D are plan views illustrating a method for fabricating a touch panel according to the first embodiment.

A metal is deposited on the substrate 100 and is selectively removed, as shown in FIGS. 9A and 10A, a plurality of first bridge patterns 121 spaced from one another, while passing through the cells (See D of FIG. 4) in a first direction are formed, and a first routing line 141 connected to one end of cells arranged in a first direction and a second routing line 151 connected to one end of cells arranged in a second direction are formed in the non-display region. In addition, a first routing contact line 140 partitioned into n parts, corresponding to one end of the first routing line 141 and a second routing contact line 150 partitioned into m parts corresponding to one end of the second routing line 151 are formed in the non-display region, and pad electrodes 145 and 146 connected to the other end of the first and second routing lines 141 and 152 are formed at one side of the non-display region.

The metal may be selected from molybdenum (Mo), copper (Cu), silver (Ag), chromium (Cr), aluminum (Al), aluminum neodymium (AlNd) and molybdenum titanium (MoTi), a combination thereof, and a laminate of a combination thereof.

Figure 9B:
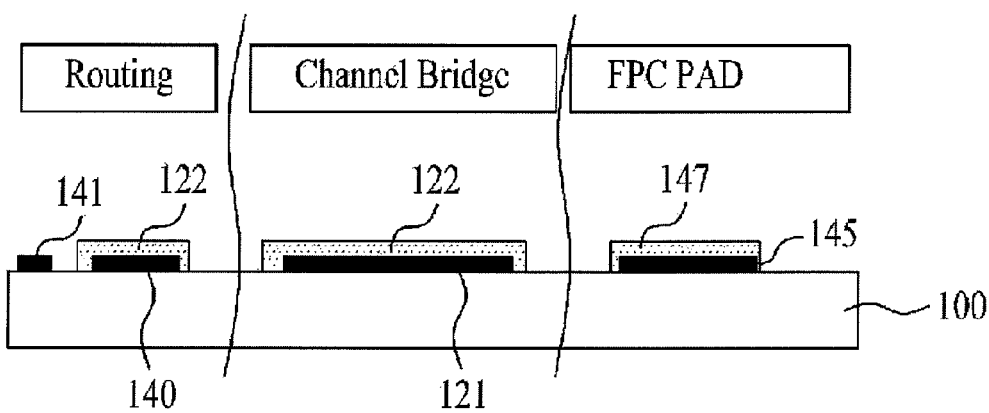
Figure 10B:
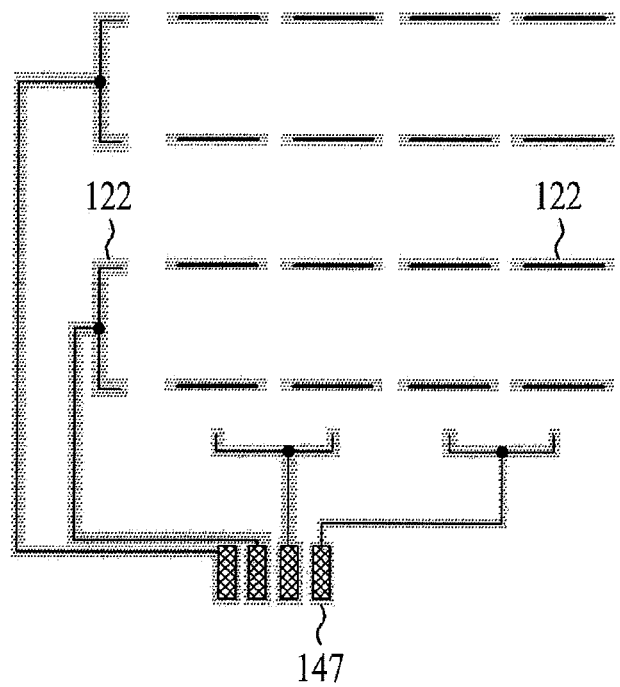

Subsequently, a transparent electrode is deposited on the substrate 100 and is selectively removed, as shown in FIGS. 9B and 10B, and first and second transparent contact electrodes 122 and 147 are formed on the first bridge pattern 121, the first routing contact line 140, the second routing contact line 150 and the pad electrodes 145 and 146.

Figure 9C:
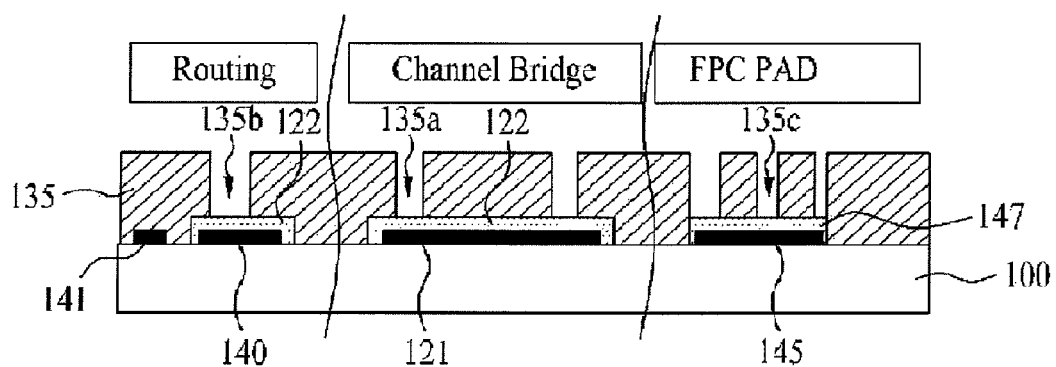
Figure 10C:
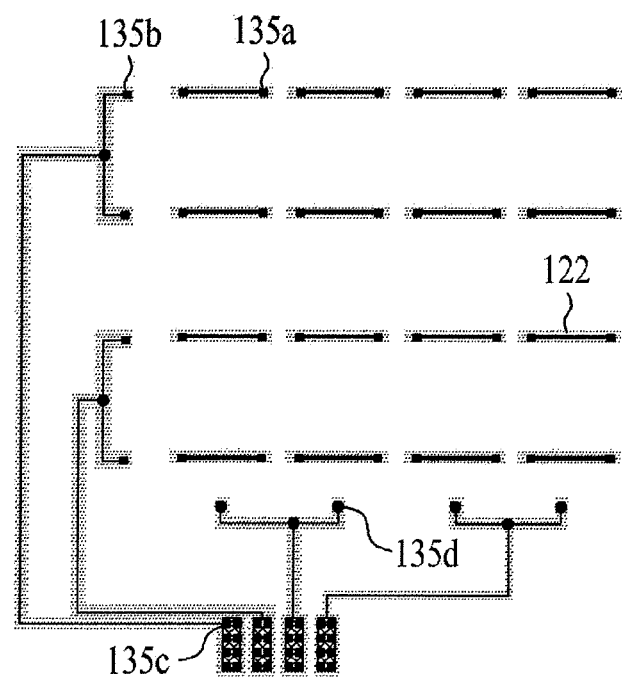

Subsequently, a first insulating film 135 is formed such that it covers the first bridge pattern 121, and first and second routing lines 141 and 151 and is then selectively removed, and as shown in FIGS. 9C and 10C, a first contact hole 135a is formed on the first bridge pattern 121 such it exposes both ends of the first transparent contact electrode 122, second contact holes 135b and 135d are formed to expose the first transparent contact electrodes 122 on one end of the first and second routing contact lines 140 and 150, and a third contact hole 135c is formed to partially expose the second transparent contact electrodes 147 on the pad electrodes 145 and 146.

The first insulating film 135 may include at least one of a nitride film ($SiN_x$), an oxide film ($SiO_x$), a nitride oxide film ($SiN_xO_y$) and an organic thin film with a thickness of about 0.1 μm to about 1 μm. The organic thin film may be selected from various materials such as a photoacrylic resin, an epoxy resin and the like.

Figure 9D:
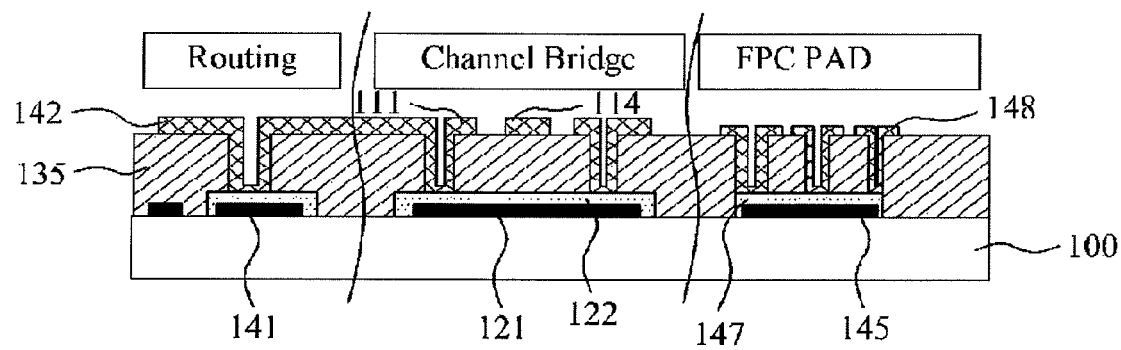
Figure 10D:
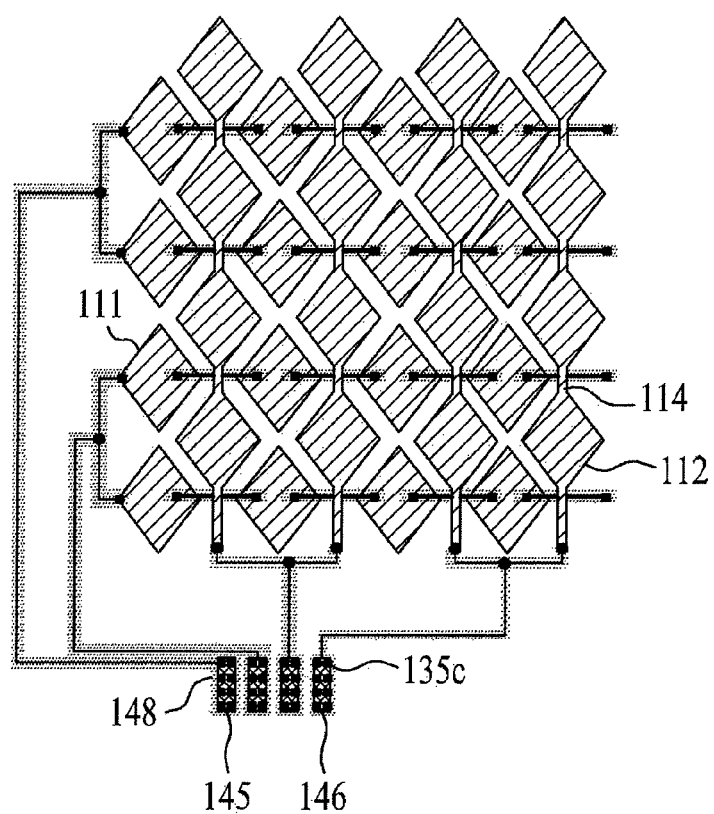

Subsequently, the first to third contact holes 135a, 135b, 135d and 135c are embedded, a transparent electrode is deposited on the first insulating film 135 and is selectively removed, as shown in FIGS. 9D and 10D, first electrodes 111 arranged in a first direction such that they are connected to the adjacent first bridge pattern 121 through the first contact hole 135a, second electrodes 112 arranged in a second direction such that they are spaced from the first electrodes 111, and second bridge patterns 114 to connect the adjacent two second electrodes 112 are formed. At the same time, the end of the first electrodes 111 and the end of the second electrodes 112 contact the first and second routing lines 141 and 151) through second contact holes 135b and 135d, respectively, and a pad transparent electrode 148 is further formed on the second transparent contact electrode 147 in the pad region.

As mentioned in embodiments of device above, at each cell, n (n is an integer of 2 or higher) first electrodes are arranged in a second direction and m (m is an integer of 2 or higher) second electrodes are arranged in a first direction.

\* Second Embodiment of Fabrication Method \*

FIGS. 11A to 11D are plan views illustrating a method for fabricating a touch panel according to a second embodiment.

In accordance with the method for fabricating a touch panel according to the second embodiment, one end of the first and second routing lines is provided with a connection portion composed of a transparent electrode, which can realize thickness decrease in a shared portion of routing lines, as compared to the afore-mentioned first embodiment. In addition, to share the first and second sensors, the first connection portion 117 and the second connection portion 118 composed of a transparent electrode are formed, while forming the first and second connection portions 117 and 118, and n first electrodes are connected in a second direction and m electrodes are connected in a first direction, thus reducing resistance of the contact portion between the first and second routing lines 141 and 151 and the first and second connection portions 117 and 118.

The method for fabricating a touch panel according to a second embodiment will be described in detail.

First, a substrate, wherein a plurality of cells in the form of matrixes is defined, is prepared (See. FIG. 9A).

Figure 11A:
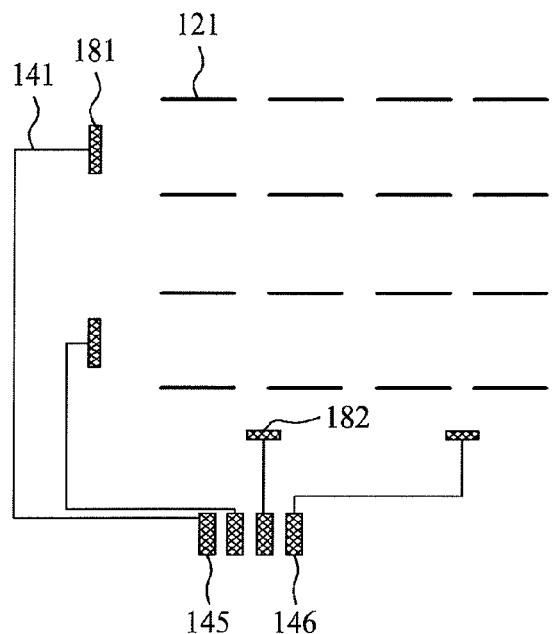
FIGS. 11A to 11D are plan views illustrating a method for fabricating a touch panel according to a second embodiment.

A metal is deposited on the substrate 100, and then selectively removed, as shown in FIG. 11A, a plurality of first bridge patterns 121 spaced from one another in a first direction, while passing through the cells (See D of FIG. 4) are formed, and a first routing line 141 connected to one end of cells arranged in a first direction and a second routing line 151 connected to one end of cells arranged in a second direction are formed in the non-display region. In addition, a first routing contact portion 181 corresponding to one end of the first routing line 141, a second routing contact portion 182 corresponding to one end of the second routing line 151, and pad electrodes 145 and 146 connected to the other end of the first and second routing lines 141 and 152 at one side of the non-display region are formed in the non-display region.

Figure 11B:
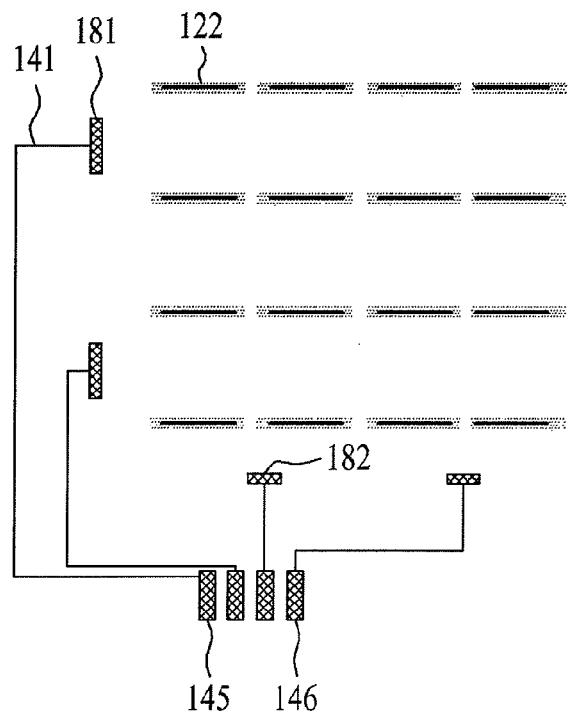

Subsequently, a transparent electrode is deposited on the substrate 100 and is selectively removed, as shown in FIG. 11B, and a first transparent contact electrode (122) is formed on the first bridge pattern 121.

Figure 11C:
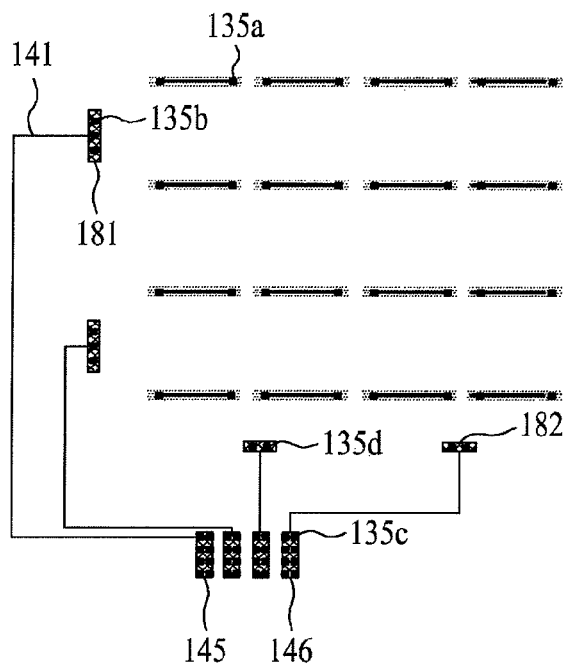

Subsequently, a first insulating film (135 in FIG. 9C) is formed such that it covers the first bridge pattern 121, first and second routing lines 141 and 151), and then selectively removed, and as shown in FIG. 11C, a first contact hole 135a to expose both ends of the first transparent contact electrode 122 on the first bridge pattern 121 is formed, second contact holes 135b and 135d to expose the first and second routing contact portions 181 and 182 are formed, and a third contact hole 135c to expose the pad electrodes 145 and 146 is formed.

Figure 11D:
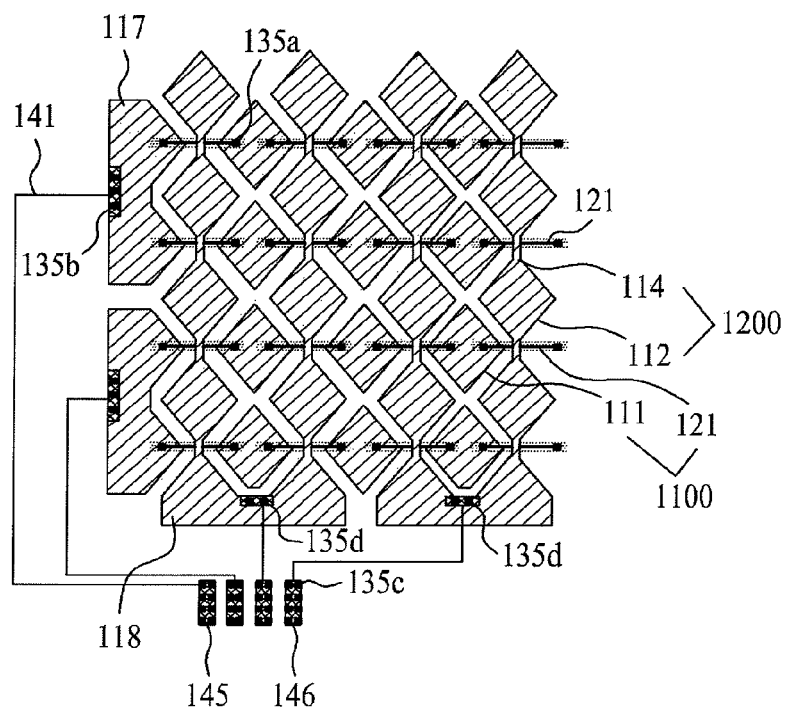

Subsequently, the first to third contact holes 135a, 135b, 135d and 135c are embedded, a transparent electrode is deposited on the first insulating film 135 and is selectively removed, as shown in FIG. 11D, first electrodes 111 arranged in a first direction such that they are connected to the adjacent first bridge pattern 121 through the first contact hole 135a, second electrodes 112 arranged in a second direction such that they are spaced from the first electrodes 111, and second bridge patterns 114 to connect the adjacent two second electrodes 112 are formed. In addition, a first connection portion 117 connected to the first routing contact portion 181 and the first bridge pattern 121 is formed such that it connects one first routing line 141 to n first sensors 1100, and a second connection portion 118 connected to the second routing contact portion 182 and the second bridge pattern 114 is formed such that it connects one first routing line 141 to n first sensors 1200. The first connection portion 117 has a shape, wherein an isosceles triangle pattern provided by adjacent first sensors 1100 connected to the first bridge pattern 121 is integrated with a rectangular pattern connected to the first connection portion 117, while contacting the side of the triangle pattern.

The second connection portion 118 rotates 90 degrees counterclockwise with respect to the first connection portion 118.

Although the first connection portion 117 and the second connection portion 118 composed of transparent electrodes are described in the drawing, only one of the connection portions may be composed of a transparent electrode and the other may be a routing contact line which branches from one end of a routing line, as shown in FIGS. 10A to 10D.

Description of the same elements as in the first embodiment will be omitted.

\* Third Embodiment of Fabrication Method \*

FIGS. 12A to 12D are plan views illustrating a method for fabricating a touch panel according to a third embodiment.

Figure 12A:
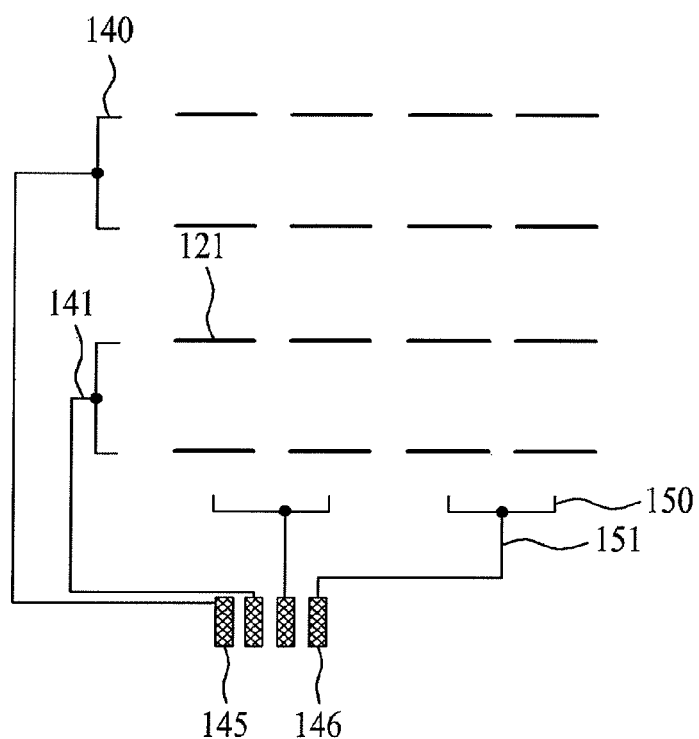
FIGS. 12A to 12D are plan views illustrating a method for fabricating a touch panel according to a third embodiment.
Figure 12B:
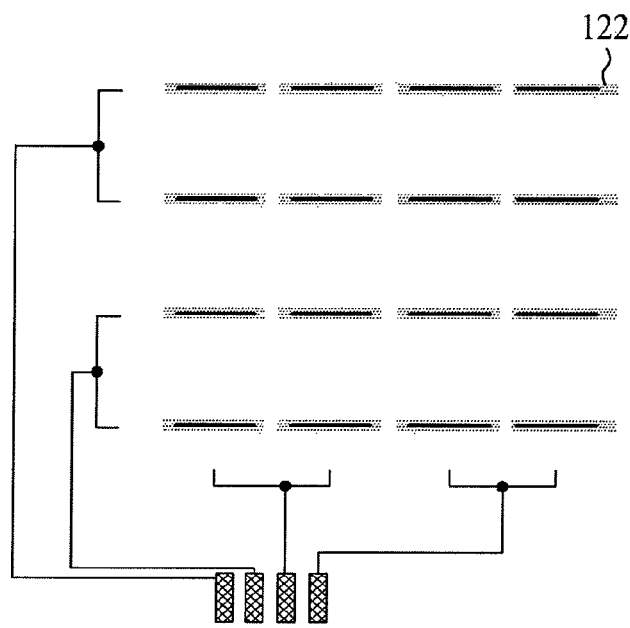
Figure 12C:
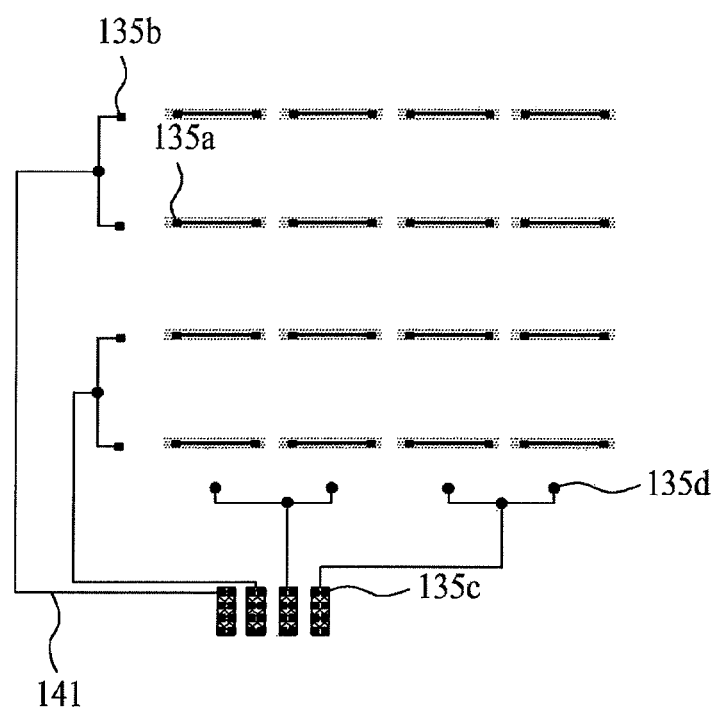
Figure 12D:
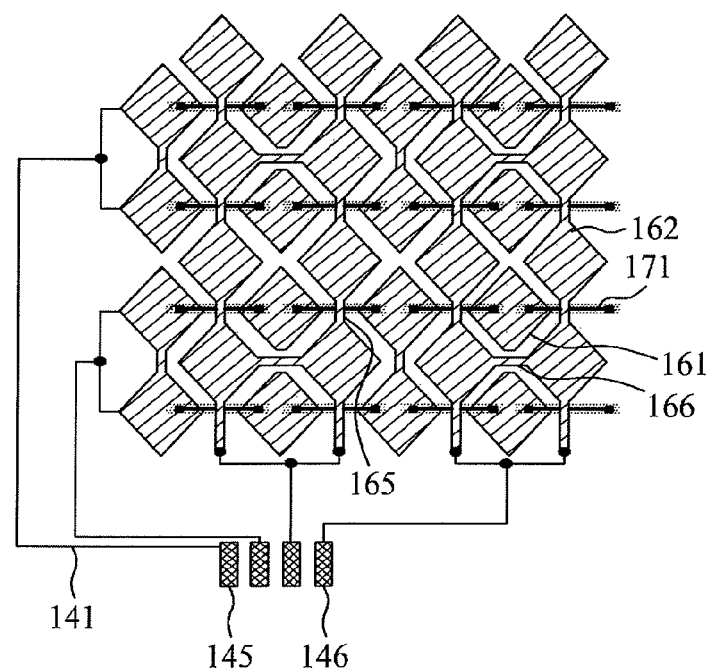

The fabrication method of the touch panel according to the third embodiment is the same as illustrated in FIGS. 10A to 10C of the afore-mentioned first embodiment except that the first and second redundancy patterns 165 and 166 are further patterned with transparent electrodes, as shown in FIG. 12D.

In this instance, the first redundancy pattern 165 is formed between adjacent first electrodes 161 such that it crosses the first electrodes 161, and the second redundancy pattern 166 is formed between adjacent second electrodes 162 such that it crosses the second electrodes 162.

Description of the same elements as in first embodiment will be omitted.

\* Fourth Embodiment of Fabrication Method \*

Figure 13A:
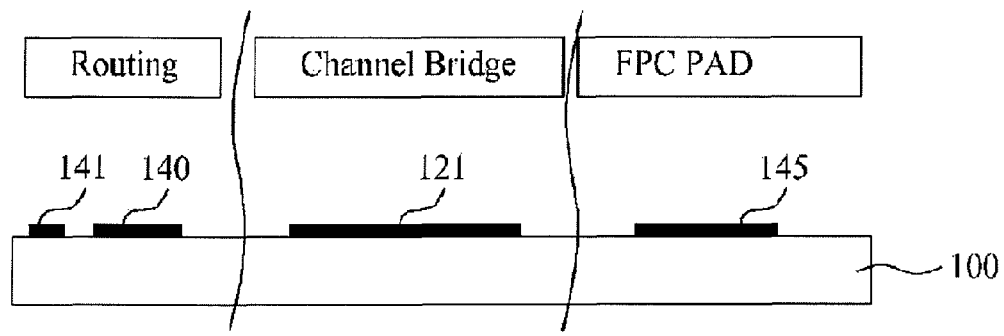
FIGS. 13A to 13C are sectional views illustrating a method for fabricating a touch panel according to the fourth embodiment.
Figure 13B:
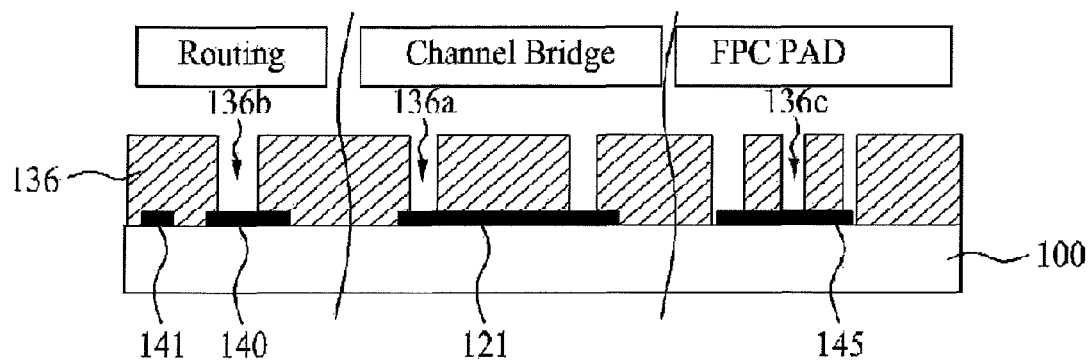
Figure 13C:
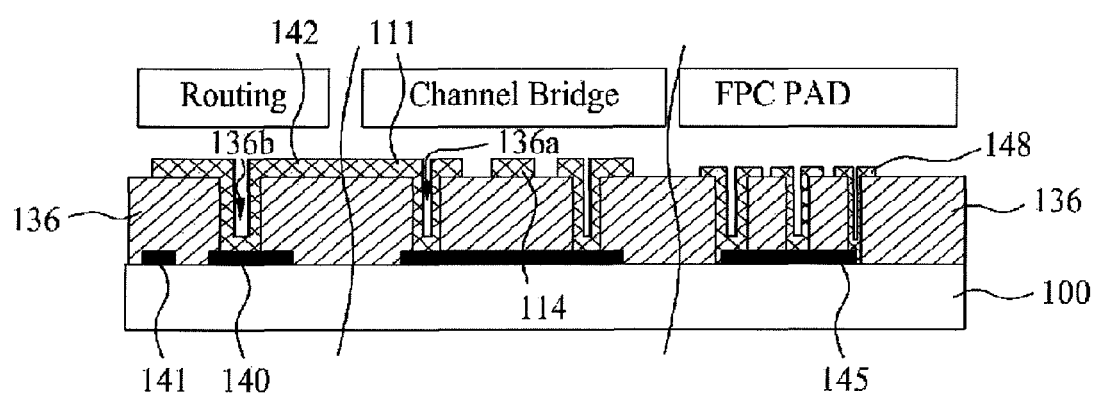
Figure 14A:
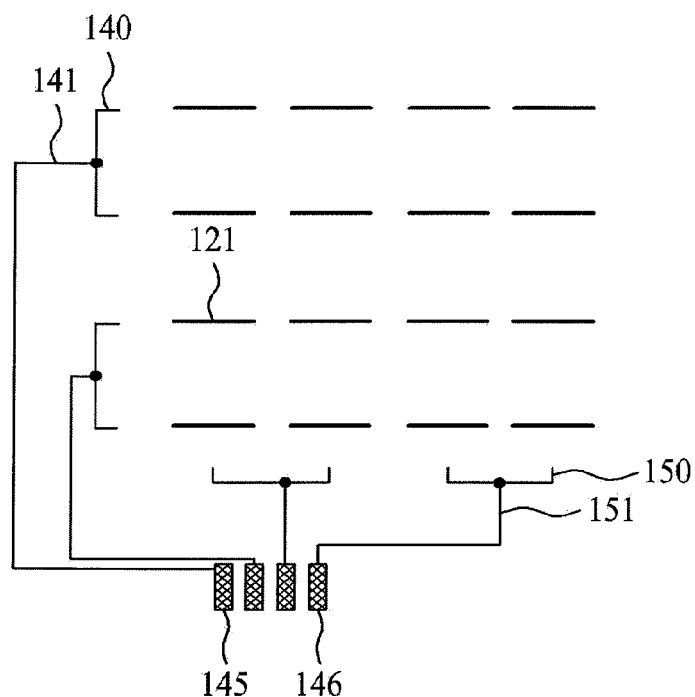
FIGS. 14A to 14C are plan views illustrating a method for fabricating a touch panel according to the fourth embodiment.
Figure 14B:
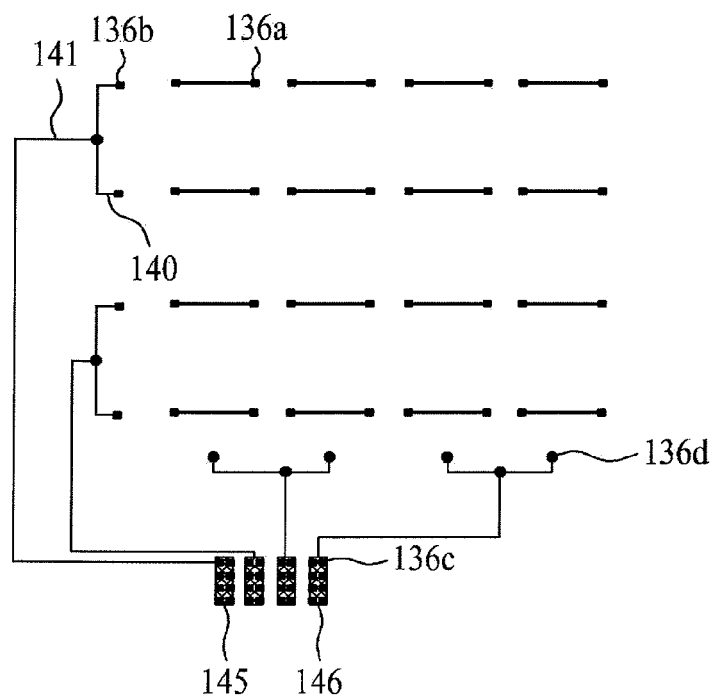
Figure 14C:
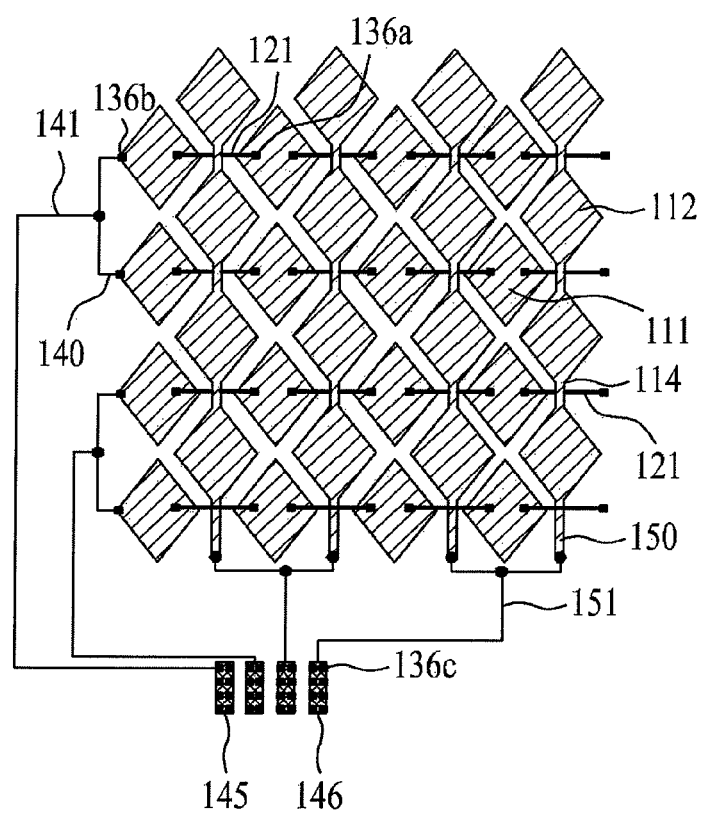

FIGS. 13A to 13C are sectional views illustrating a method for fabricating a touch panel according to a fourth embodiment of the present invention. FIGS. 14A to 14C are plan views illustrating a method for fabricating a touch panel according to a fourth embodiment of the present invention.

The method for fabricating the touch panel according to the fourth embodiment will be described in detail.

First, a substrate 100, wherein a plurality of cells in the form of matrixes is defined, is prepared. The substrate 100 includes an active region A/A provided with the cells and a non-display region, in which the first and second routing lines and pad electrodes are formed, present at a periphery.

A metal is deposited on the substrate 100 and is selectively removed, as shown in FIGS. 13A and 14A, a plurality of first bridge patterns 121 spaced from one another in a first direction, while passing through the cells (See D of FIG. 4) are formed, and a first routing line 141 connected to one end of cells arranged in a first direction and a second routing line 151 connected to one end of cells arranged in a second direction are formed in the non-display region. In addition, a first routing contact line 140 partitioned into n parts, corresponding to one end of the first routing line 141 and a second routing contact line 150 partitioned into m parts corresponding to one end of the second routing line 151 are formed in the non-display region, and pad electrodes 145 and 146 are formed at one side of the non-display region such that they are connected to the other end of the first and second routing lines 141 and 152.

Subsequently, a first insulating film 136 is formed such that it covers the first bridge pattern 121, and first and second routing lines 141 and 151 and is then selectively removed, and as shown in FIGS. 13B and 14B, a first contact hole 136a to expose both ends of the first bridge pattern 121 is formed, second contact holes 136b and 136d to expose one end of the first and second routing contact lines 140 and 150 is formed, and a third contact hole 136c to partially expose the pad electrodes 145 and 146 is formed.

Subsequently, the first to third contact holes 136a, 136b, 136d and 136c are embedded, a transparent electrode is deposited on the first insulating film 136 and is selectively removed, as shown in FIGS. 13C and 14C, first electrodes 111 arranged in a first direction such that they are connected to the adjacent first bridge pattern 121 through the second contact hole 136b, second electrodes 112 arranged in a second direction such that they are spaced from the first electrodes 111, and second bridge patterns 114 to connect the adjacent two second electrodes 112 such that the second bridge patterns 114 contact one end of the second routing contact line 150 through the second contact hole 136b are formed. In addition, a transparent pad electrode 148 composed of a transparent electrode is further formed on the pad electrode 145 such that it is connected through the third contact hole 136c.

As mentioned above in device embodiments, at each cell, n first electrodes are arranged in a second direction (n is an integer of 2 or higher) and m (m is an integer of 2 or higher) second electrodes are arranged in a first direction.

The fourth embodiment is different from the first embodiment in that the first and second transparent contact electrodes 122 and 147 are omitted.

* Fifth Embodiment of Fabrication Method *

Figure 15A:
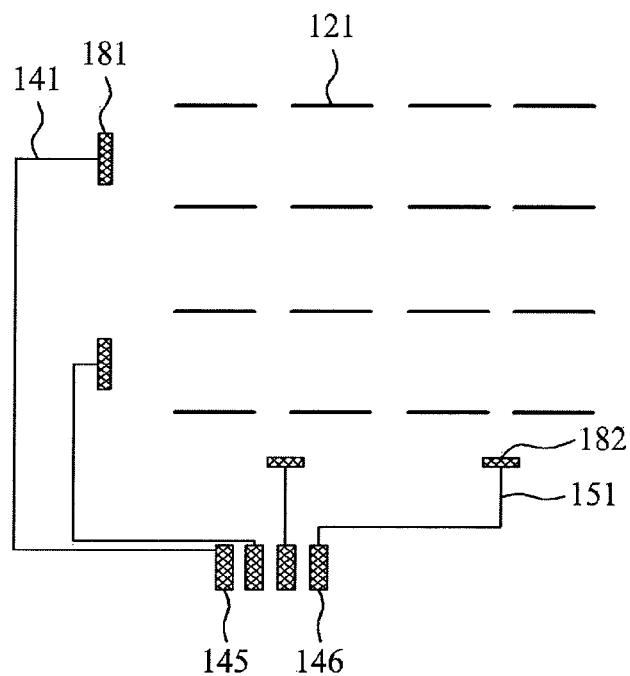
FIGS. 15A to 15C are plan views illustrating a method for fabricating a touch panel according to a fifth embodiment.
Figure 15B:
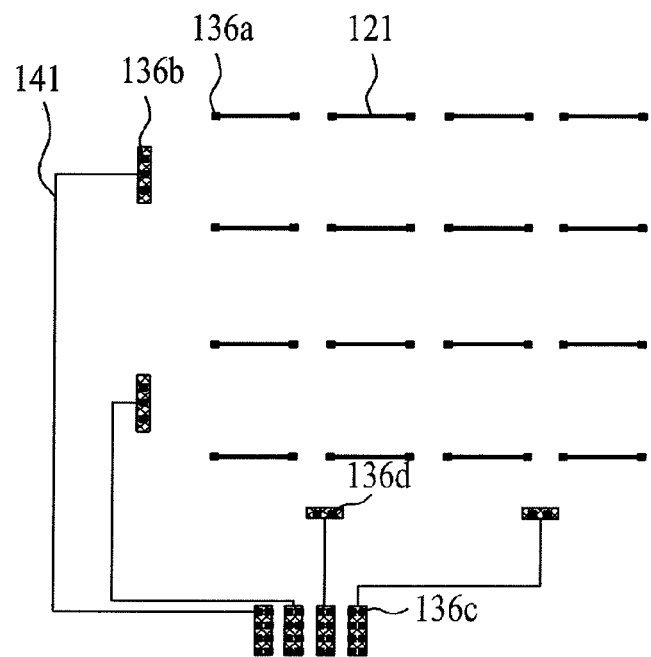
Figure 15C:
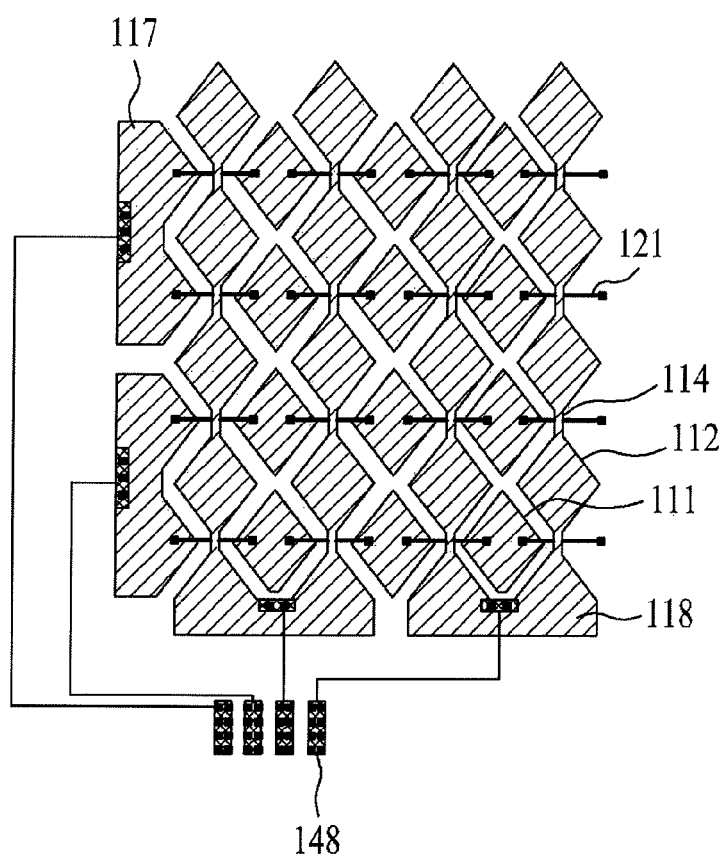

FIGS. 15A to 15C are plan views illustrating a method for fabricating a touch panel according to a fifth embodiment of the present invention.

In accordance with the fabrication method of the touch panel according to the fifth embodiment, first routing contact portion 181 and a second routing contact portion 182 are formed, instead of the first routing line 140 and the second routing line 150 branched into a plurality of portions in the fourth embodiment, as shown in FIG. 15A, an insulating film 136 including second contact holes 136b and 136d is formed on the first routing contact portion 181 and the second routing contact portion 182, as shown in FIG. 15B, and the transparent electrode is patterned, a first connection portion 117 in contact with the first routing contact portion 181 through the second contact hole 136b and a second connection portion 118 in contact with the second routing contact portion 182 through the second contact hole 136d are formed, as shown in FIG. 15C.

The fifth embodiment is the same as the fourth embodiment except for processes for forming the first and second connection portions 117 and 118, and description of the same elements is omitted.

In this instance, the first and second routing lines 141 and 151 are connected at one end thereof to the first routing contact portion 181 and the second routing contact portion 182 and have a connection portion composed of transparent electrodes, which can reduce the length of the routing lines, as compared to the afore-mentioned fourth embodiment. In addition, the triangular shape of the first and second connection portions 117 and 118 is present in the active region, which enables detection of touch in the first and second connection portions 117 and 118.

* Sixth Embodiment of Fabrication Method *

Figure 16A:
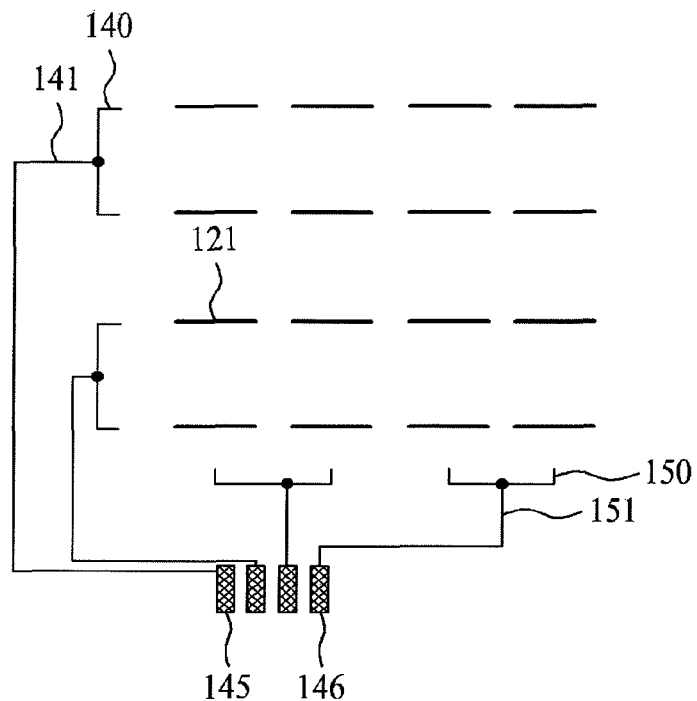
FIGS. 16A to 16C are plan views illustrating a method for fabricating a touch panel according to a sixth embodiment.
Figure 16B:
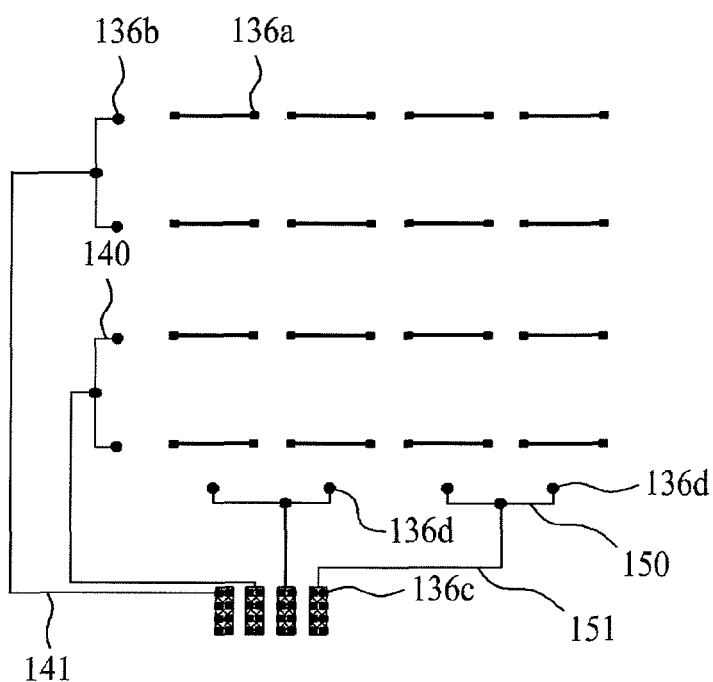
Figure 16C:
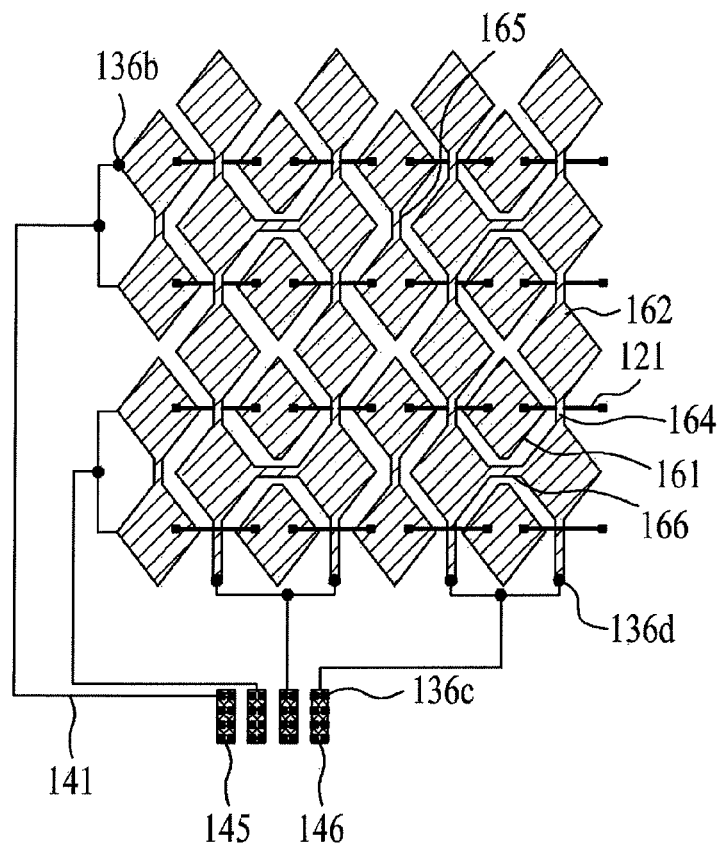

FIGS. 16A to 16C are plan views illustrating a method for fabricating a touch panel according to a sixth embodiment.

The fabrication method of the touch panel according to a sixth embodiment is the same as illustrated in FIGS. 13A to 13B of the afore-mentioned fourth embodiment except that the first and second redundancy patterns 165 and 166 are further patterned with transparent electrodes, as shown in FIGS. 16C.

In this instance, the first redundancy pattern 165 is formed between adjacent first electrodes 161 such that it crosses the first electrodes 161, and the second redundancy pattern 166 is formed between adjacent second electrodes 162 such that it crosses the second electrodes 162.

The first electrodes 161 and the first bridge pattern 121 to connect the same are arranged in a first direction to constitute first sensors, and the second electrodes 162 and the second bridge patterns 164 to connect the same are arranged in a second direction crossing the first direction to constitute second sensors.

Description of the same elements as in the fourth embodiment will be omitted.

* Seventh Embodiment of Fabrication Method *

FIGS. 17A to 17D are sectional views illustrating a method for fabricating a touch panel according to a seventh embodiment of the present invention. FIGS. 18A to 18D are plan views illustrating a method for fabricating a touch panel according to a seventh embodiment of the present invention.

The seventh embodiment is different from the first embodiment in that the first bridge pattern is formed on the insulating film, rather than under the same, and the first and second electrodes and the second bridge pattern are formed under the insulating film. A more detailed description thereof will be illustrated below.

Figure 17A:
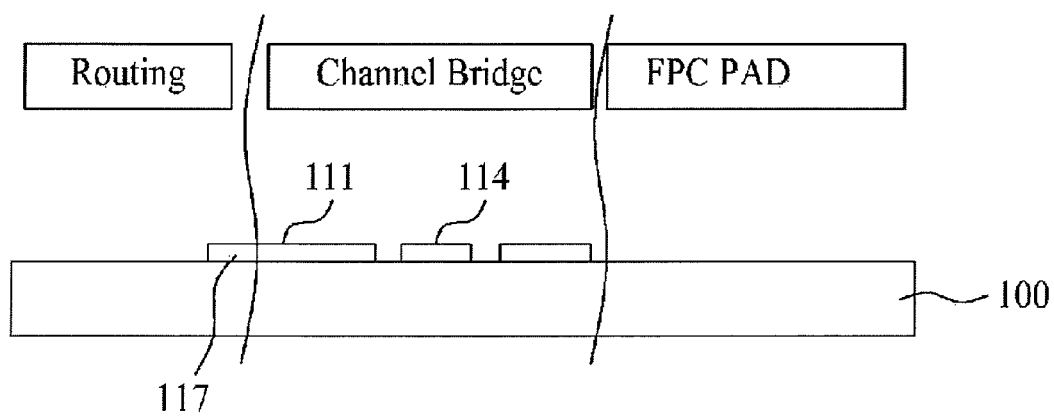
FIGS. 17A to 17D are sectional views illustrating a method for fabricating a touch panel according to a seventh embodiment.

A transparent electrode is deposited on a substrate 100, in which a plurality of cells are defined in the form of matrixes, and is selectively removed, as shown in FIGS. 17A, a plurality of first electrodes 111 and a plurality of second electrodes 112 spaced from one another by a predetermined distance such that they cross each other in a first direction and in a second direction (the first and second directions cross each other), and second bridge patterns 114 to connect the adjacent two second electrodes 112 in an integrated form are formed.

Figure 17B:
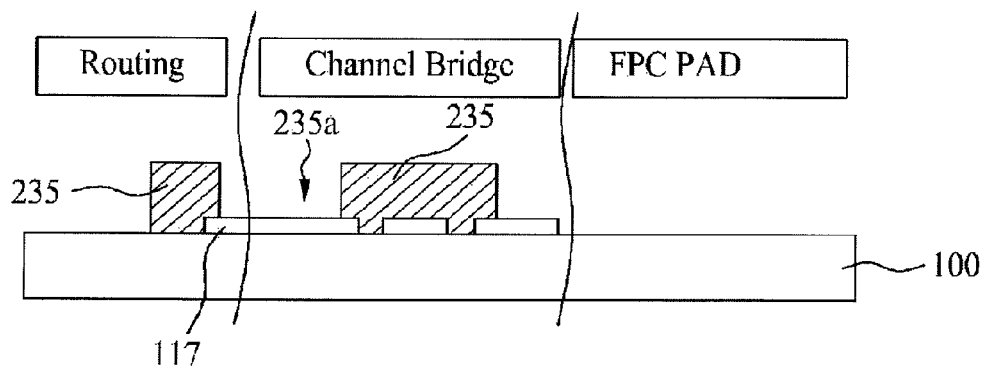

Subsequently, a first insulating film 235 is formed such that it covers the second bridge pattern 114 and the first and second electrodes 111 and 112, and then selectively removed, and as shown in FIG. 17B, a first contact hole 235a to expose both ends of the second electrodes in a second direction is formed. At this time, the first insulating film 235 may be formed such that it opens a pad region and a routing line region and covers the second bridge pattern 114. Alternatively, the first insulating film 235 may be formed such that it covers only the second bridge pattern 114, to directly connect the first and second routing lines 141 and 151 to the first electrode 111 and the second electrode 112 without using any contact hole. Alternatively, as shown in FIG. 17B, the first and second electrodes 111 and 112 further comprise the second contact hole for further contact through the routing line at the outermost end.

Figure 17C:
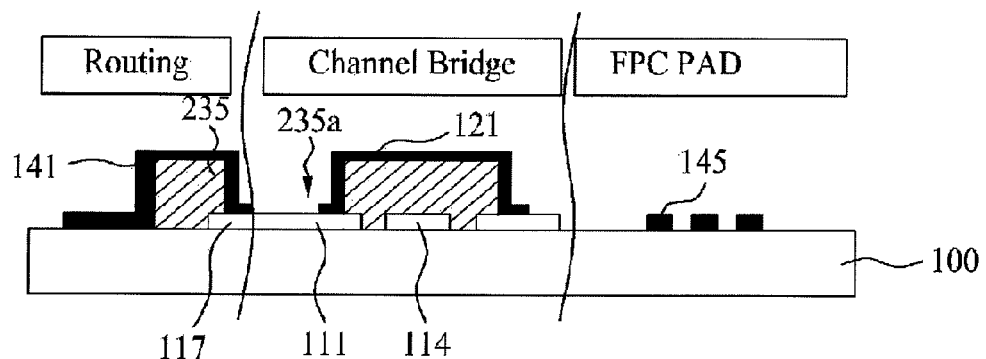
Figure 18A:
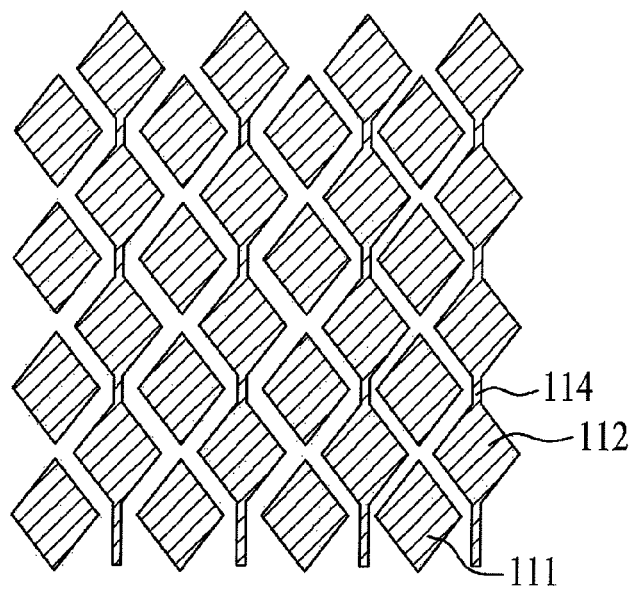
FIGS. 18A to 18D are plan views illustrating a method for fabricating a touch panel according to the seventh embodiment.
Figure 18B:
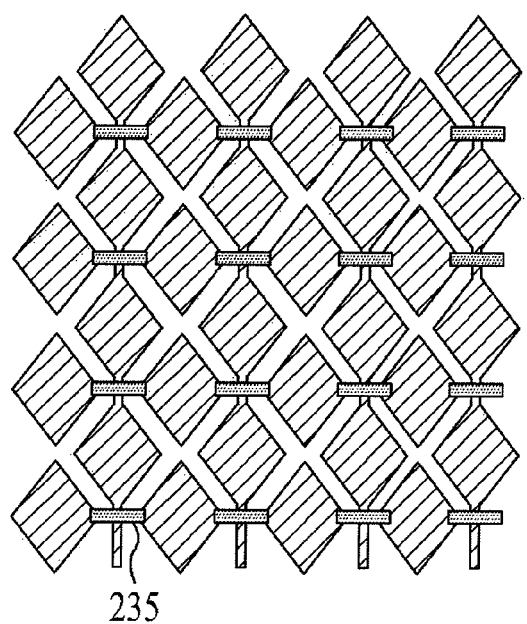
Figure 18C:
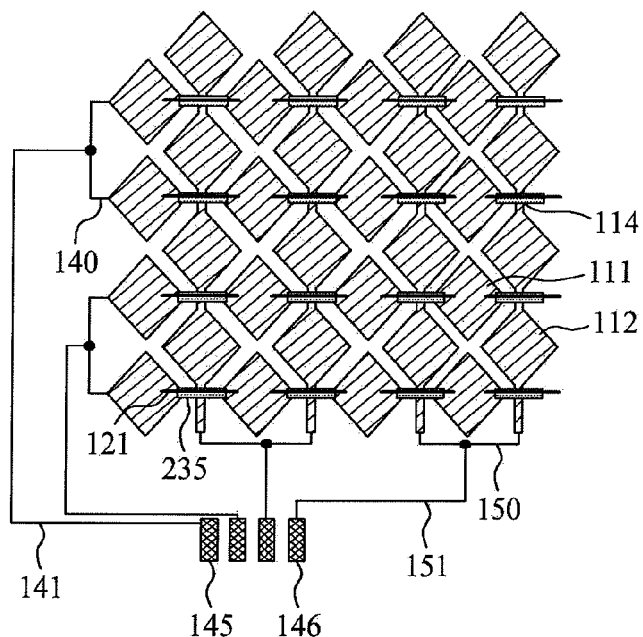

Subsequently, the first contact holes 235a are embedded, and a metal is deposited on the first insulating film 235 and is selectively removed, as shown in FIGS. 17C and 18C, a first bridge pattern 121 to connect the adjacent first electrodes 111 to which the first insulating film is exposed, a first routing line 141 connected to one end of cells arranged in a first direction and a second routing line 151 connected to one end of cells arranged in a second direction are formed. Furthermore, in the pad region, pad electrodes 145 and 146 connected to the other end of the first routing line 141 and the second routing line 151 are formed.

At this time, one end of the first routing line 141 and the second routing line 151 includes a first and second routing contact line 140 and 150 branched from first sensors 1100 and second sensors 1200 adjacent to cells which share electric signals applied by the routing lines.

Figure 17D:
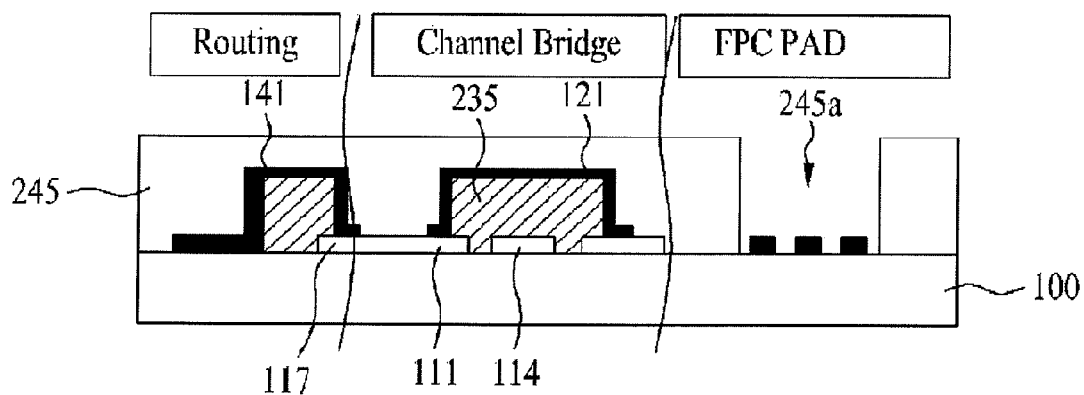
Figure 18D:
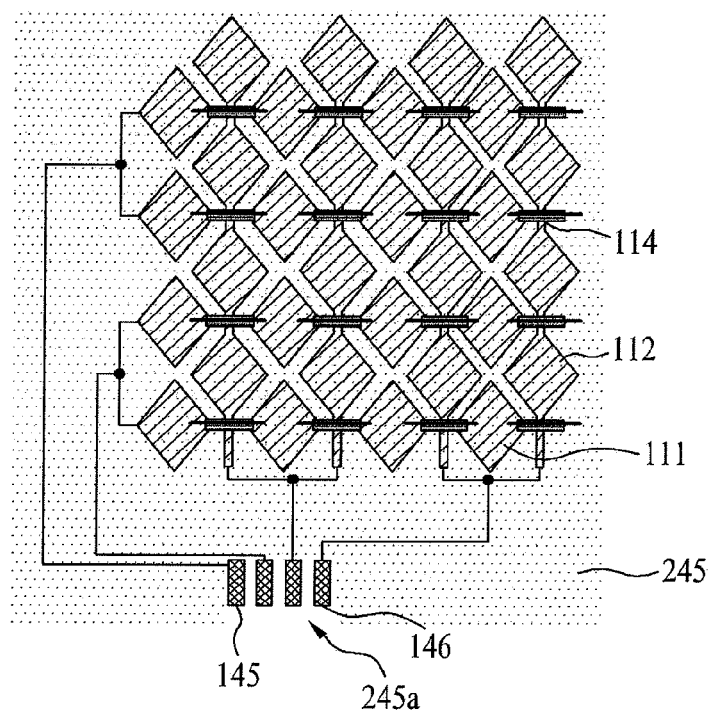

At each cell, n first electrodes 111 are arranged in a second direction (n is an integer of 2 or higher) and m (m is an integer of 2 or higher) second electrodes 112 are arranged in a first direction. A second insulating film 245 is formed over the entire surface including the first bridge pattern 121, the first and second routing lines 141 and 151, and the pad electrodes 145 and 146, and as shown in FIGS. 17D and 18D, a fifth contact hole 245a is formed on the pad electrodes 145 and 146 such that it is exposed.

The first electrode 161 and the first bridge pattern 121 connected to each other in one direction constitute a first sensor 1100, and the second electrode 162 and the second bridge pattern 164 connected to each other in another direction constitute a second sensor 1200.

* Eighth Embodiment of Fabrication Method *

FIGS. 19A to 19D are plan views illustrating a method for fabricating a touch panel according to an eighth embodiment.

Figure 19A:
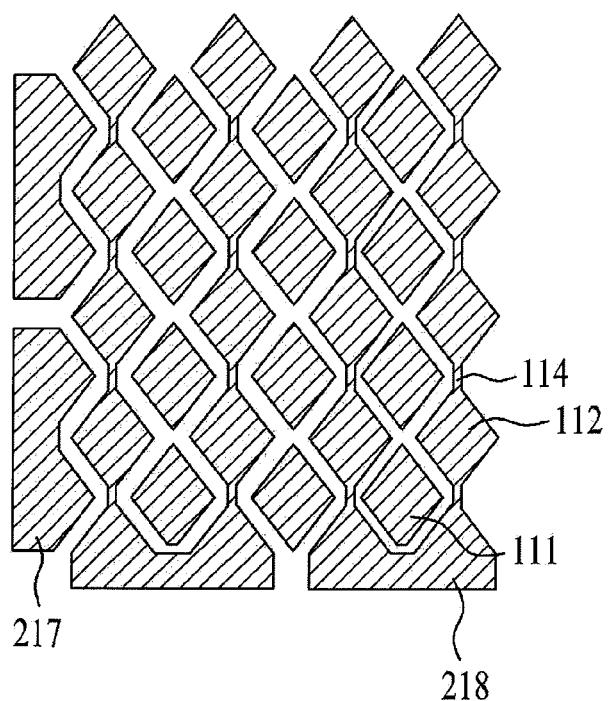
FIGS. 19A to 19D are plan views illustrating a method for fabricating a touch panel according to an eighth embodiment.
Figure 19B:
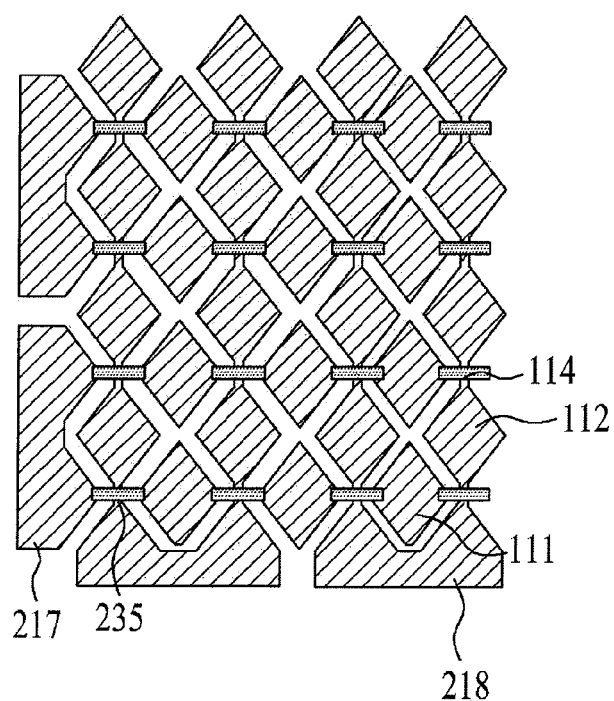
Figure 19C:
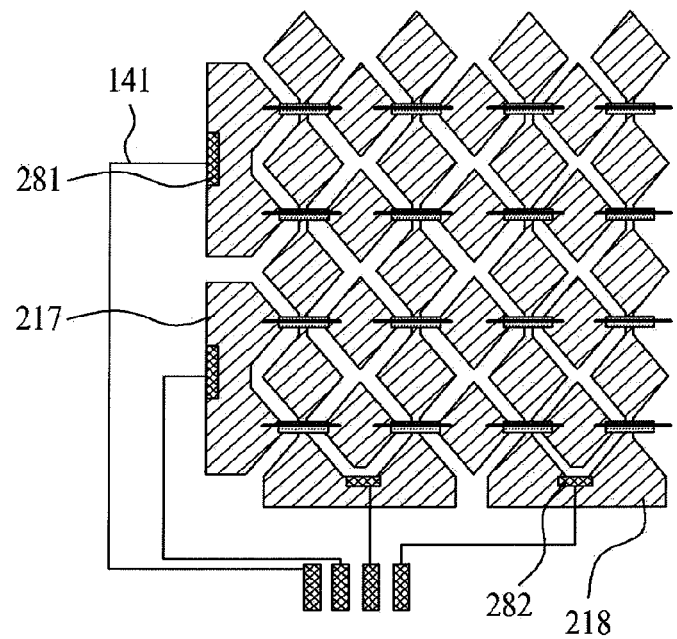

In the fabrication method of the touch panel according to the eighth embodiment, a first connection portion 217 and a second connection portion 218 are formed at the interface between routing regions and cells using materials for transparent electrodes, without using a plurality of first routing lines 140 and second routing lines 150 in the seventh embodiment, as shown in FIG. 19A. A first insulating film 235 is formed such that it passes though the second bridge pattern 114 in a first direction, as shown in FIG. 19B. Subsequently, as shown in FIG. 19C, a first routing line 141 which directly contacts the first connection portion 217 through the first routing contact portion 281, and a second routing line 151 which directly contacts the second connection portion 218 through the second routing contact portion 282 are formed.

Figure 19D:
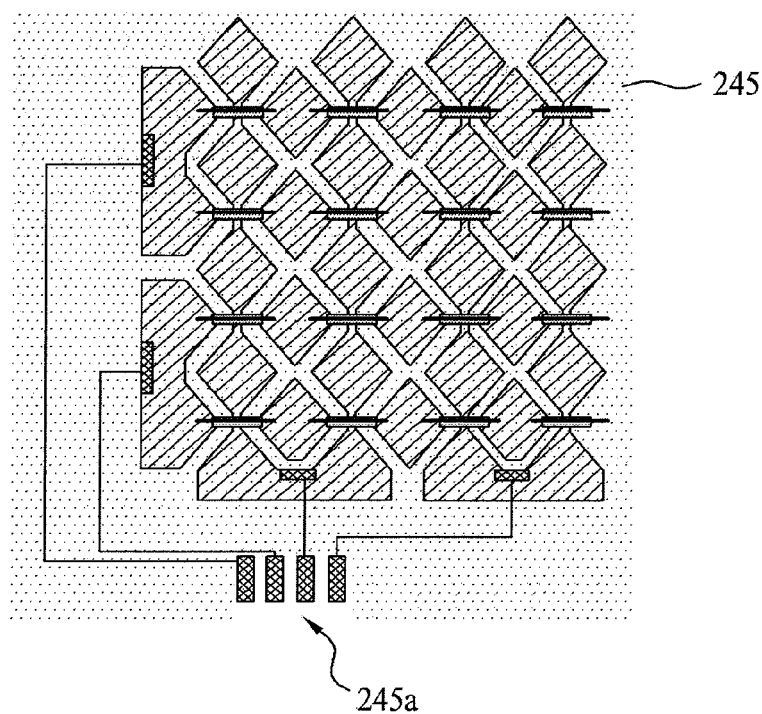

In FIG. 19D, like the afore-mentioned seventh embodiment, a second insulating film 245 provided with a fifth contact hole 245a is formed by exposing only the pad region.

In this instance, the first and second routing lines 141 and 151 are connected at one end thereof to the first routing contact portion 281 and the second routing contact portion 282 and have a connection portion composed of transparent electrodes, which can reduce the length of the routing lines, as compared to the afore-mentioned seventh embodiment. In addition, the triangular shape of the first and second connection portions 217 and 218 is present in the active region, which enables detection of touch in the first and second connection portions 217 and 218 and thus an increase in active area.

* Ninth Embodiment of Fabrication Method *

FIGS. 20A to 20D are plan views illustrating a method for fabricating a touch panel according to a ninth embodiment.

Figure 20A:
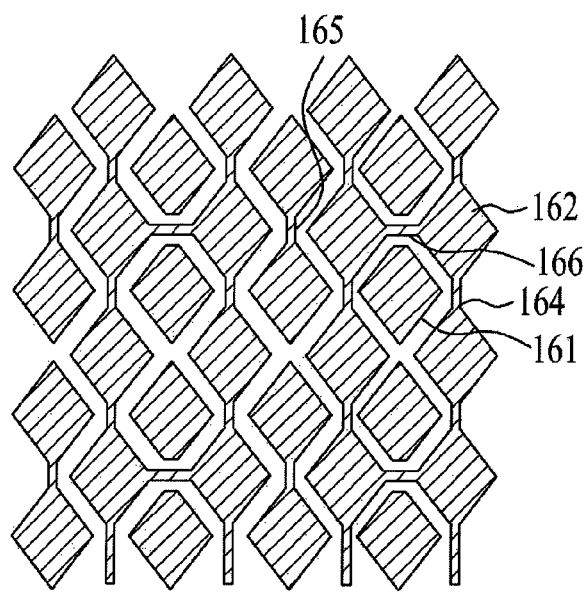
FIGS. 20A to 20D are plan views illustrating a method for fabricating a touch panel according to a ninth embodiment.
Figure 20B:
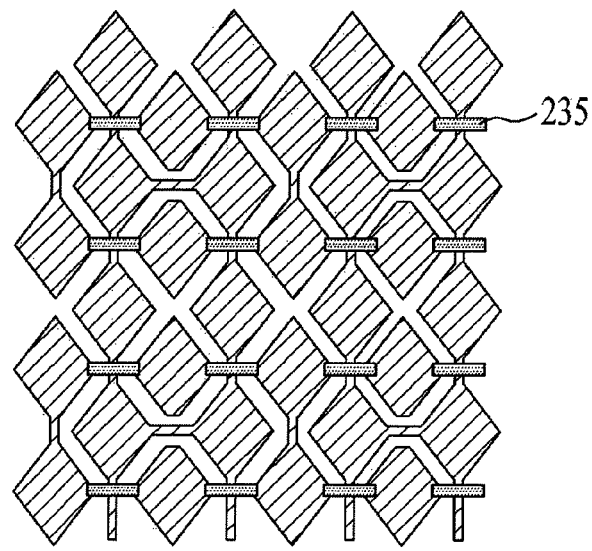
Figure 20C:
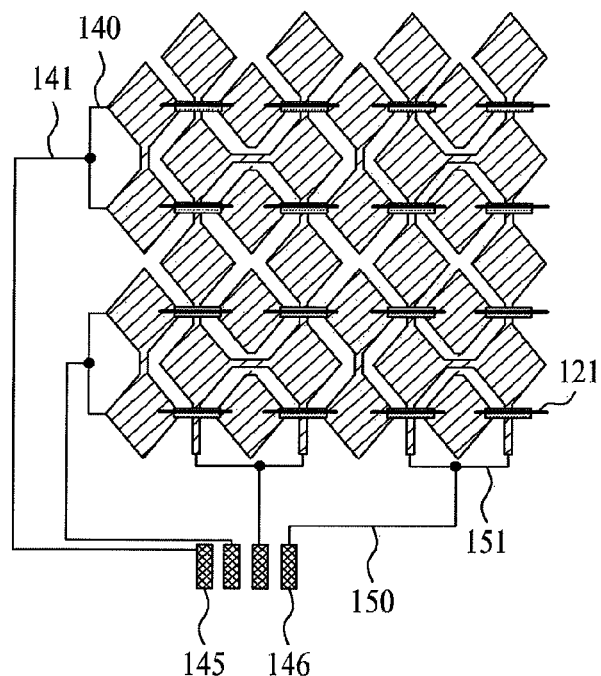
Figure 20D:
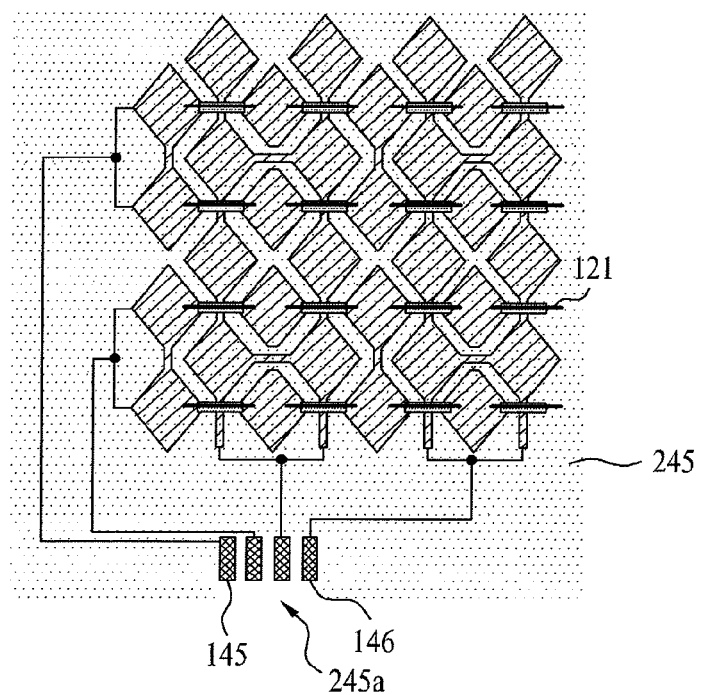

The fabrication method of the touch panel according to the ninth embodiment is the same as in the afore-mentioned seventh embodiment except that in the step in FIG. 20A, the first and second redundancy patterns 165 and 166 are further patterned with transparent electrodes.

That is, the first redundancy pattern 165 is formed between adjacent first electrodes 161 such that it crosses the first electrodes 161, and the second redundancy pattern 166 is formed between adjacent second electrodes 162 such that it crosses the second electrodes 162.

Description of the same elements as in the seventh embodiment will be omitted.

* Tenth Embodiment of Fabrication Method *

Figure 21A:
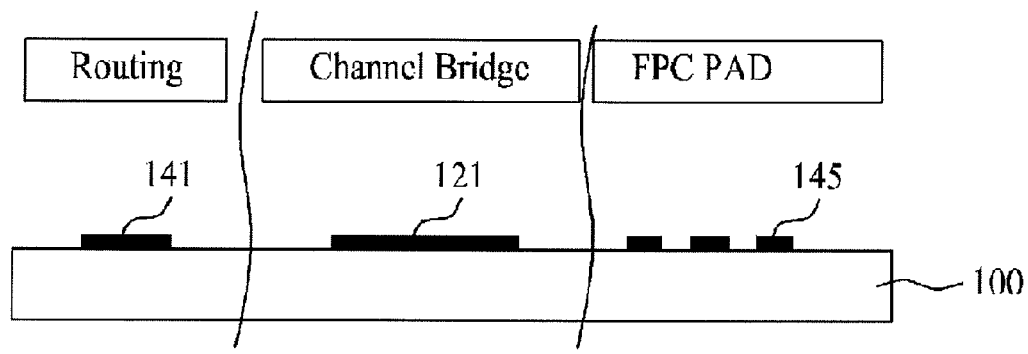
FIGS. 21A to 21C are sectional views illustrating a method for fabricating a touch panel according to a tenth embodiment.
Figure 21B:
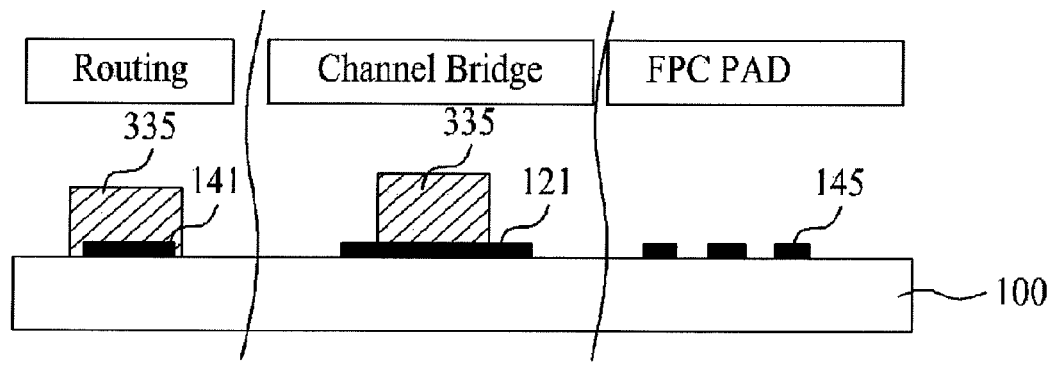
Figure 21C:
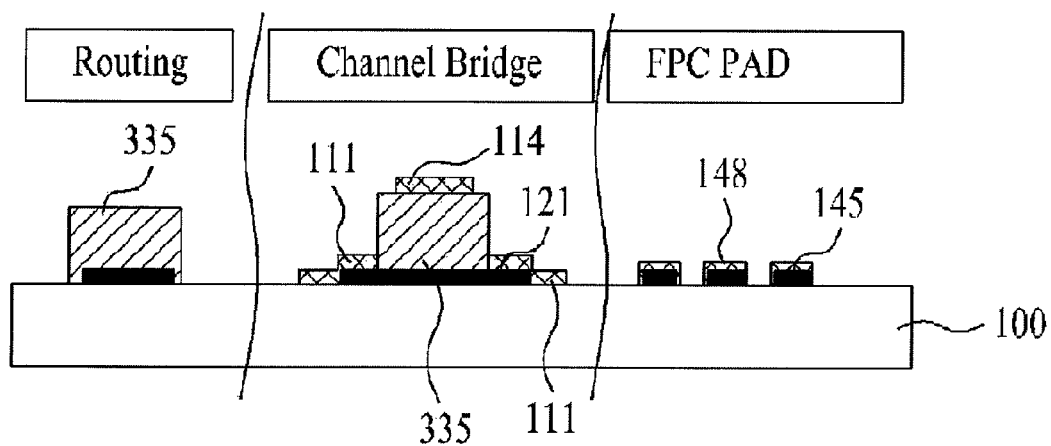
Figure 22A:
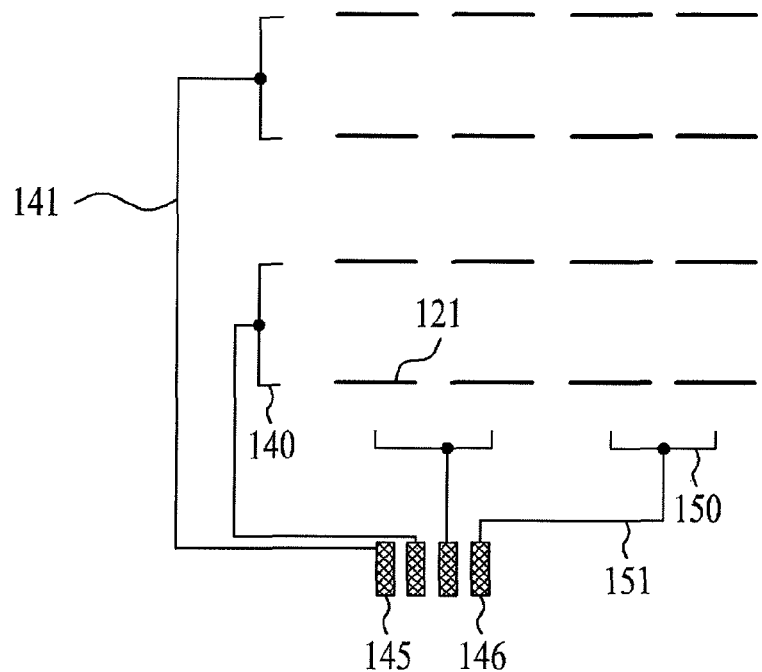
FIGS. 22A to 22C are plan views illustrating a method for fabricating a touch panel according to a tenth embodiment.
Figure 22B:
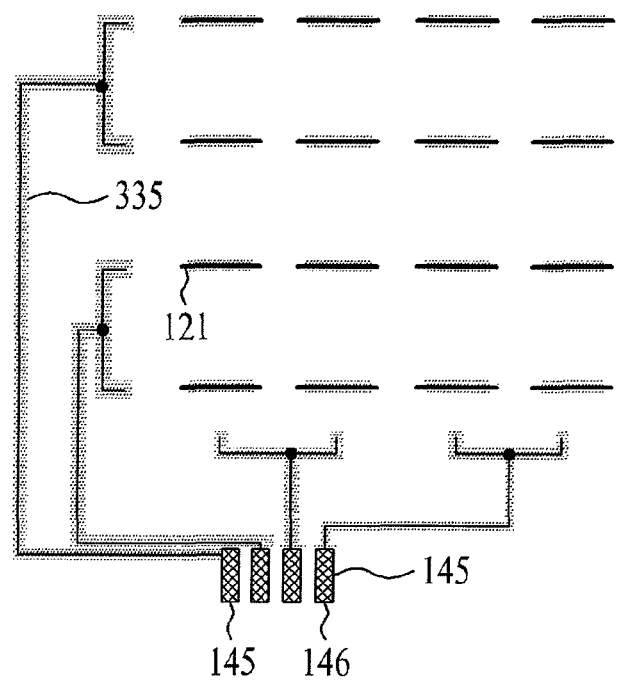
Figure 22C:
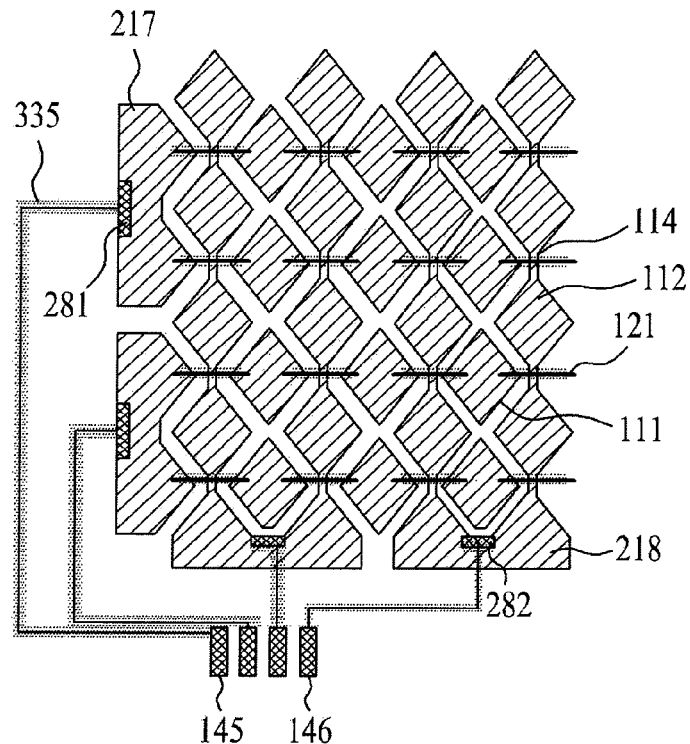

FIGS. 21A to 21C are sectional views illustrating a method for fabricating a touch panel according to a tenth embodiment of the present invention. FIGS. 22A to 22C are plan views illustrating a method for fabricating a touch panel according to a tenth embodiment of the present invention.

The method for fabricating the touch panel according to the tenth embodiment will be described in detail.

First, a substrate 100, wherein a plurality of cells in the form of matrixes is defined, is prepared. The substrate 100 includes an active region A/A provided with the cells and a non-display region, in which the first and second routing lines and pad electrodes are formed, present at a periphery thereof.

A metal is deposited on the substrate 100 and is selectively removed, as shown in FIGS. 21A and 22A, a plurality of first bridge patterns 121 which are spaced from one another and pass through the cells in a first direction, and a first routing line 141 connected to one end of cells arranged in a first direction and a second routing line 151 connected to one end of cells arranged in a second direction are formed such that the first routing line 141 crosses the second routing line 151 in the non-display region. In addition, a first routing contact line 140 partitioned into n parts, corresponding to one end of the first routing line 141 and a second routing contact line 150 partitioned into m parts corresponding to one end of the second routing line 151 are formed in the non-display region, and pad electrodes 145 and 146 are formed at one side of the non-display region such that they are connected to the other end of the first and second routing lines 141 and 152.

Subsequently, a first insulating film 335 is formed such that it covers the first bridge pattern 121, and the first and second routing lines 141 and 151, and is then selectively removed, and as shown in FIGS. 21B and 22B, to allow the first insulating film 335 to remain only on a portion of the first bridge pattern 121, the first routing line 141 and the second routing line 151. In this instance, the first insulating film 335 opens to expose the pad electrodes 145 and 146.

Subsequently, a transparent electrode is deposited on the first insulating film 136 and is selectively removed, as shown in FIGS. 21C and 22C, first electrodes 111 are formed in a first direction such that the first electrode extends from one end of the first bridge pattern 121 to the other end of another first bridge pattern 121, second electrodes 112 arranged in a second direction such that they are spaced from the first electrodes 111, and second bridge patterns 114 to connect the adjacent two second electrodes 112 are formed. In addition, a transparent pad electrode 148 is further formed in the pad region such that it covers the pad electrodes 145 and 146.

The first insulating film 335 is selectively removed and patterned to allow only a region where the first bridge pattern 121 is to be formed to remain and thus open all of regions in which electric short is not generated.

In this instance, the first insulating film 335 is formed only in a region corresponding to the first bridge pattern 12 of the insulating film, to minimize use of an insulating film in sensing regions and thus improve transmittance.

As mentioned above in device embodiments, at each cell, n (n is an integer of 2 or higher) first electrodes are arranged in a second direction and m (m is an integer of 2 or higher) second electrodes are arranged in a first direction.

The afore-mentioned tenth embodiment is different from the fourth embodiment, in that the first insulating film 335 is selectively formed only in a portion of the first bridge pattern and the first and second routing lines 141 and 151.

In this instance, the first electrodes 111 and the second electrodes 112 can directly contact the first and second routing contact lines 140 and 150 without using the first insulating film.

* Eleventh Embodiment of Fabrication Method *

Figure 23A:
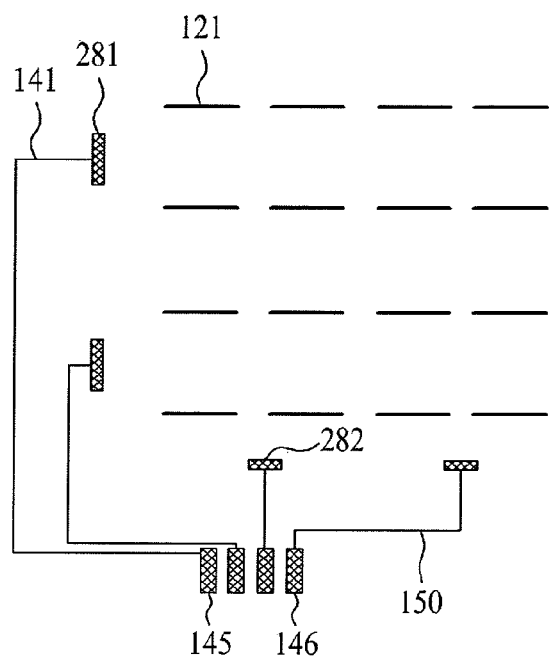
FIGS. 23A to 23C are plan views illustrating a method for fabricating a touch panel according to an eleventh embodiment.
Figure 23B:
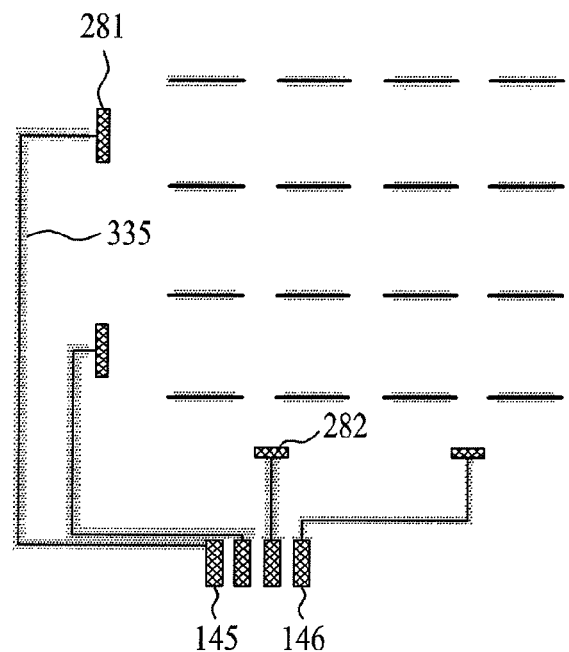
Figure 23C:
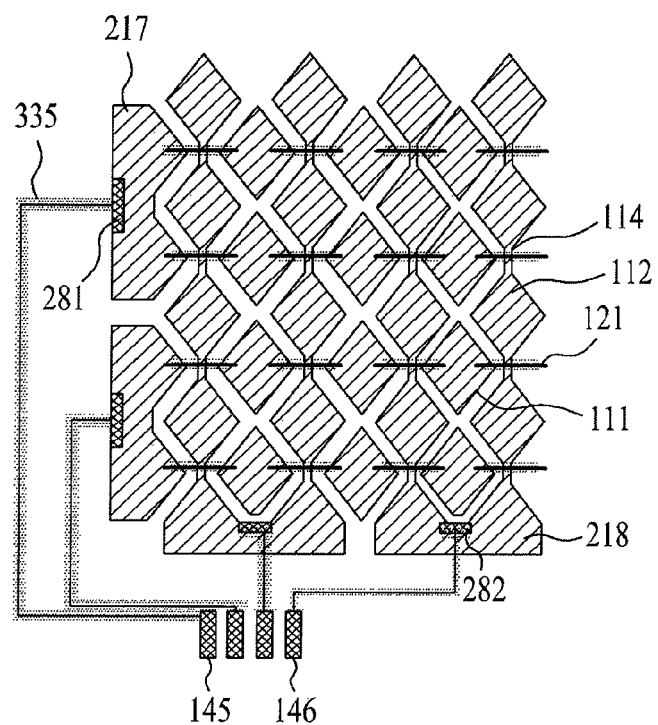

FIGS. 23A to 23C are plan views illustrating a method for fabricating a touch panel according to an eleventh embodiment of the present invention.

In accordance with the fabrication method of the touch panel according to the eleventh embodiment, a first routing contact portion 181 and a second routing contact portion 182 are formed, instead of the first routing line 140 and the second routing line 150 branched into a plurality of portions in the tenth embodiment, respectively, as shown in FIG. 23A, the transparent electrode is patterned, and a first connection portion 217 in contact with the first routing contact portion 181 through the second contact hole 136b and a second connection portion 218 in contact with the second routing contact portion 182 through the second contact hole 136d are formed, as shown in FIG. 23C.

The fifth embodiment is the same as the fourth embodiment except for processes for forming the first and second connection portions 217 and 218, and description of the same elements is omitted.

In this instance, the first and second routing lines 141 and 151 are connected at one end thereof to the first routing contact portion 181 and the second routing contact portion 182 and have a connection portion composed of transparent electrodes, which can reduce the length of the routing lines, as compared to the afore-mentioned fourth embodiment. In addition, the triangular shape of the first and second connection portions 217 and 218 is present in the active region, which enables detection of touch in the first and second connection portions 217 and 218.

* Twelfth Embodiment of Fabrication Method *

Figure 24A:
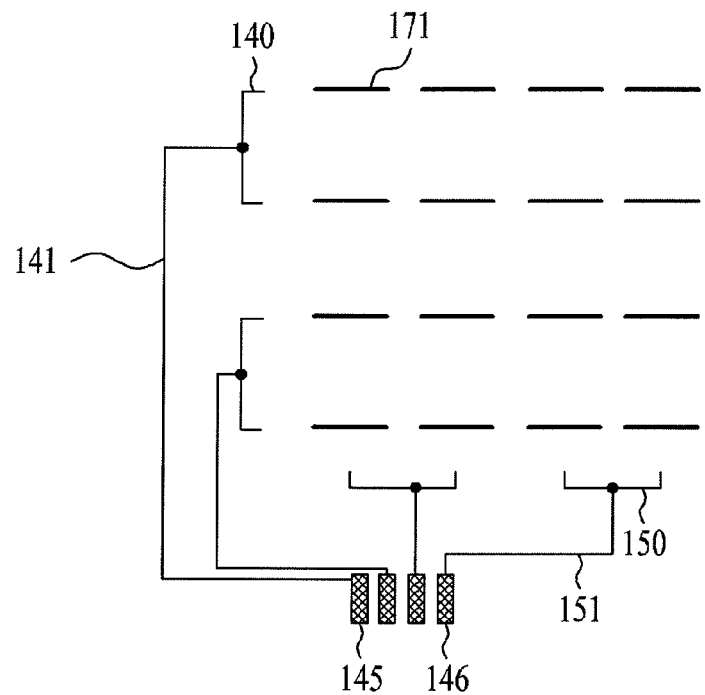
FIGS. 24A to 24C are plan views illustrating a method for fabricating a touch panel according to a twelfth embodiment.
Figure 24B:
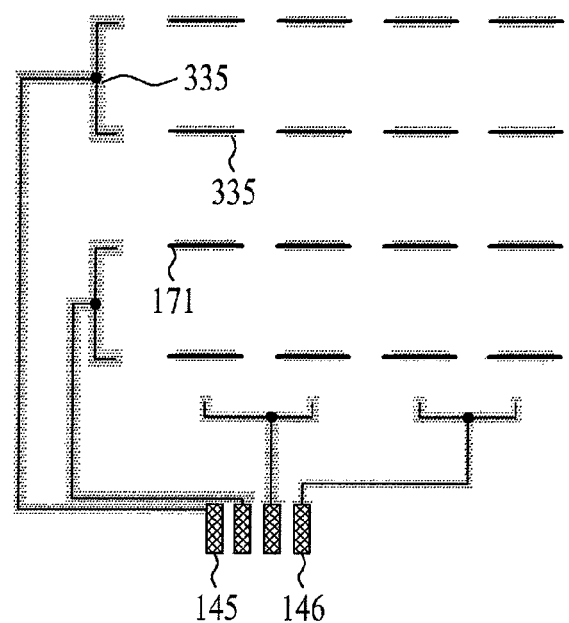
Figure 24C:
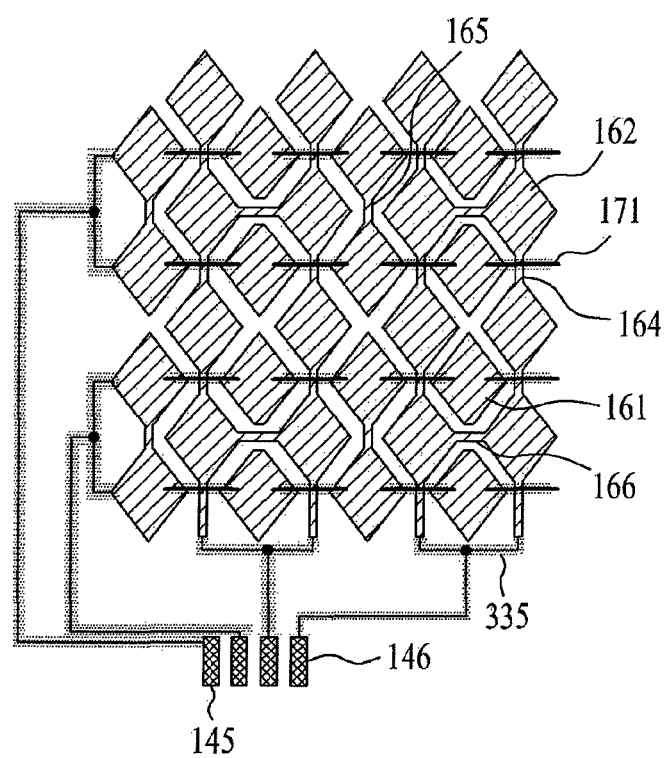

FIGS. 24A to 24C are plan views illustrating a method for fabricating a touch panel according to a twelfth embodiment.

The fabrication method of the touch panel according to the eleventh embodiment is the same as illustrated in FIGS. 21A to 21B of the afore-mentioned tenth embodiment except that the first and second redundancy patterns 165 and 166 are further patterned into transparent electrodes, as shown in FIG. 24C.

In this instance, the first redundancy pattern 165 is formed between adjacent first electrodes 161 such that it crosses the first electrodes 161, and the second redundancy pattern 166 is formed between adjacent second electrodes 162 such that it crosses the second electrodes 162.

Description of the same elements as in the eleventh embodiment will be omitted.

In the afore-mentioned embodiments, the outermost layer of the touch panels may be further provided with an additional insulating film to improve sensitivity and optical effects or an optical sheet to exhibit specific functions.

The touch sensitivity of the touch panel will be described below.

Figure 25:
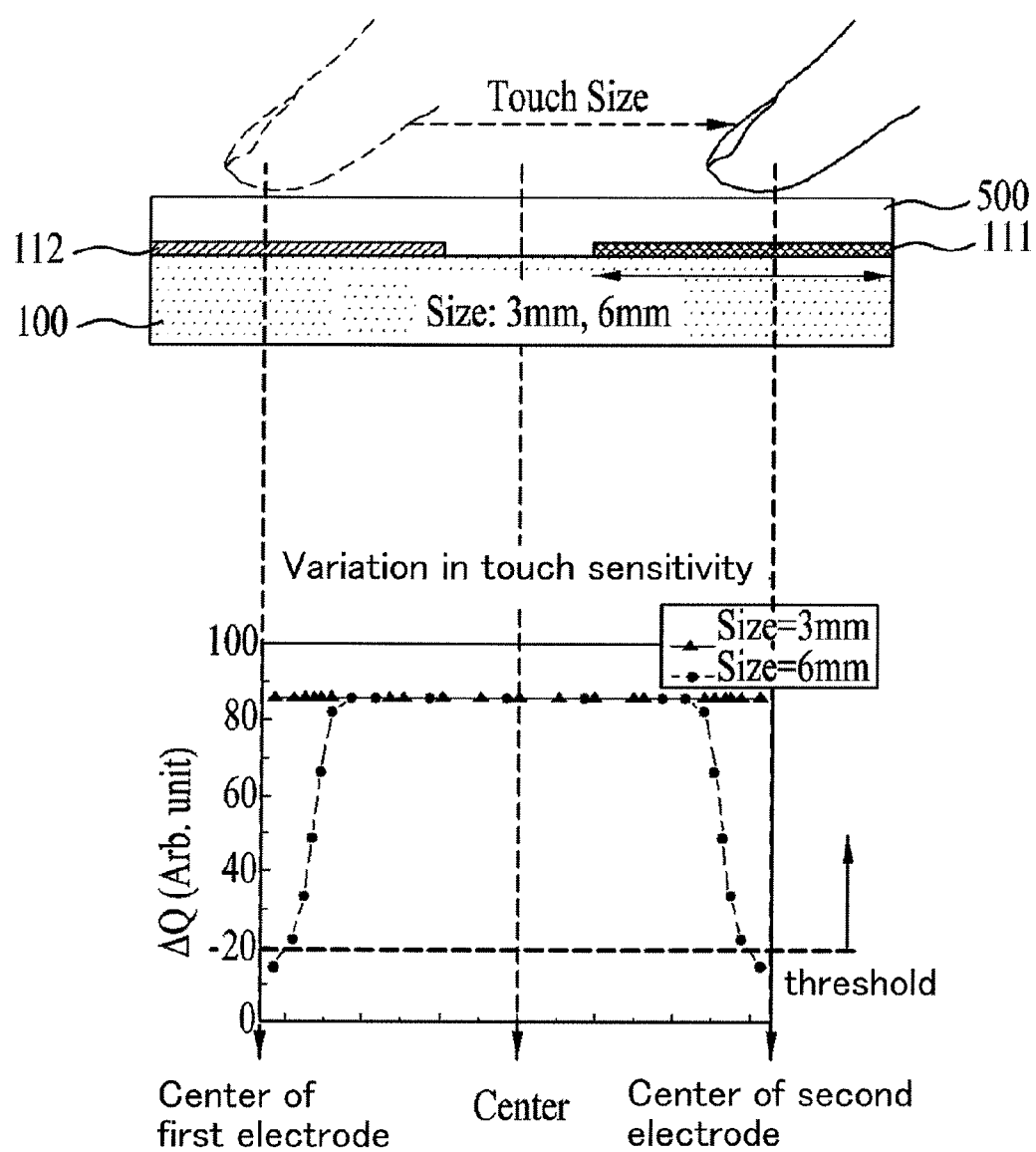
FIG. 25 is a graph showing variations in touch sensitivity from the center of the first and second electrodes to the center between the first and second electrodes.
Figure 26:
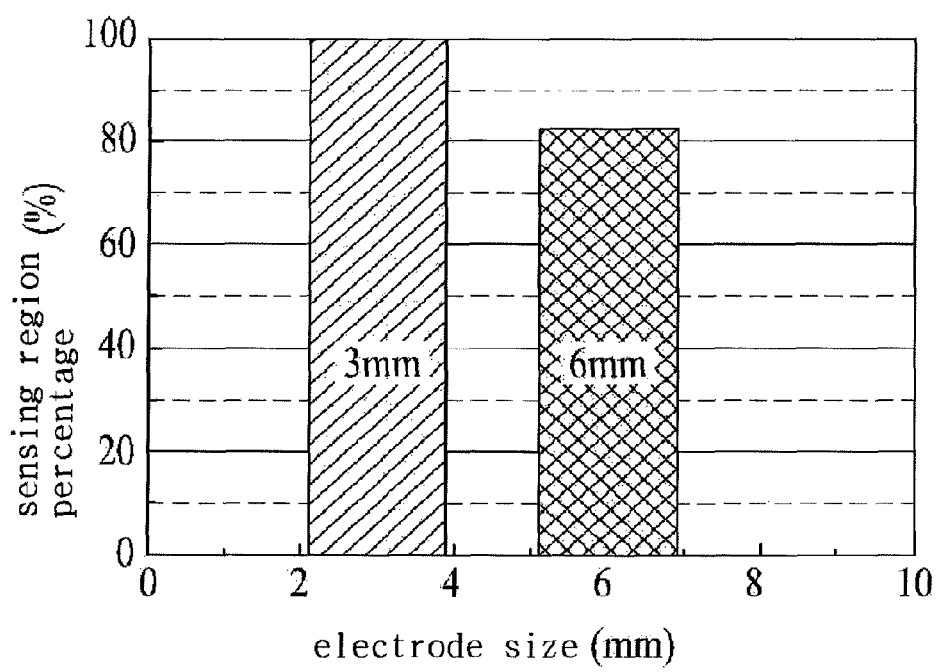
FIG. 26 is a graph showing a sensing region percentage (%) according to the width of the electrodes.

FIG. 25 is a graph showing variations in touch sensitivity from the center of the first and second electrodes to the center between the first and second electrodes and FIG. 26 is a graph showing a sensation region percentage (%) according to the width of the electrodes.

As shown in FIG. 25, touch sensing is tested, while moving the finger in the range from the center of the first electrode 111 to the center of the second electrode 112, when critical sizes (diagonal line length) of the first electrode 111 and the second electrode 112 are 3 mm and 6 mm, respectively. As can be seen from FIG. 25, when the critical size is 6 mm, sensitivity is high (about 80%) at the center between the first and second electrodes, whereas the center of the first electrode and the second electrode exhibits considerably deteriorated sensitivity.

In particular, in the instance where a threshold electric charge variation is set to about 20% of an electric charge ($\Delta Q$), when electric charge variation is equivalent to or higher than the threshold electric charge variation, "touch" is considered, and otherwise, "non-touched" is considered. At this time, although touch occurs at the center of the first and second electrodes, it cannot be sensed.

The threshold electric charge variation is set in a system. When the set value is high, deterioration in touch sensing is serious at the center of the first and second electrodes, as compared to the described conditions.

On the other hand, when the critical size of the first electrode 111 and the second electrode 112 is 3 mm, one of the first electrode 111 and the second electrode 112 is present in the touched portion and any portion can thus be sensed.

One area touched by the finger is about 5 mm, and testing is performed on a polarization plate 500 coated to a thickness of 300 μm on the first substrate 100 including the first and second electrodes 111 and 112.

In testing in FIGS. 26 and 25, a sensing area percentage is calculated according to the size of electrodes, when the first and second electrodes have a critical size of 3 mm, complete sensing is realized, and when the first and second electrodes have a critical size of 6 mm, sensitivity is deteriorated at the center of first and second electrodes, and sensing is possible only in an area of about 80%.

The factor affecting touch sensitivity is variation in electric charge before and after touch. That is, variation in electric charge before and after touch affects touch sensitivity. This is closely related to an area to be touched. More specifically, as an area to be touched increases, variations in electric charge of the first and second electrodes and mutual capacitors increase.

Accordingly, the touch panel has a structure wherein unit cells are partitioned into at least four portions and a first or second electrode is thus arranged in each portion, unlike a conventional structure wherein one sensing electrode is arranged at each unit cell. As such, when the size of first and second electrodes to be touched decreases, an area touched by the finger is at least 4-fold higher than the conventional structure. For this reason, variations in electric charge of mutual capacitors before and after touch are great, thus increasing touch sensitivity.

In addition, as illustrated above, the size of electrodes decreases, but electrodes partitioned at each cell receive signals, while they are grouped into two or more electrodes through one routing line, thus eliminating the necessity of increasing the number of signals provided by a touch controller.

In addition, the number of the routing lines do not increase, thus eliminating the necessities of increasing the area of routing lines present in a non-active area and thus of increasing a bezel margin.

In addition, large panels also have the same routing conditions as small models (the number of signals and routing lines provided) and touch sensitivity can thus be secured by controlling partition level of cells.

The touch panel described in the afore-mentioned embodiments may be present on a display panel or a display device. The display panel may be selected from (or the display device may include) a liquid crystal display panel, an organic light-emitting display panel, an electrophoretic display panel and a plasma display panel. In this instance, the touch panel may be integrated with a display panel. One substrate of the display panel may be used as a substrate in which the first and second electrodes are formed. In this instance, the substrate used as the substrate of the touch panel substrate corresponds to a display surface.

When one substrate of the display panel is used as a substrate of the touch panel, a polarization plate adhered to the display panel may be formed on the touch panel.

In this instance, as illustrated above, the touch panel according to the present invention, touch sensitivity at each region can be improved by dividing cells, thus enabling touch sensing although the polarization plate has a sufficiently small thickness of about 135 μm to about 270 μm.

In embodiments of the invention, at least one of a routing contact line, a routing contact portion, and a connection portion may be referred to as a connection part.

The touch panel and the method for fabricating the same according to the present invention have the following advantages.

First, conventional unit cells having a predetermined size to perform capacitive-type sensing are partitioned into a plurality of electrodes having an area smaller than one touch region touched by an input means and application of scan signals is performed at each unit cell. Based on such configuration, areas provided between adjacent spaced electrodes and areas provided by the centers of the electrodes are included in one touch portion of an input means without increasing application of scan signals, thus improving touch sensitivity.

That is, partition of a plurality of electrodes into each unit cell causes generation of a high initial fringe field between adjacent electrodes and great variation in capacitance when touched by an input means such as a finger, thus exhibiting considerably improved touch sensitivity, as compared to a conventional structure wherein one sensing electrode is present at each unit cell.

Second, touch sensitivity is not deteriorated in an area in which the electrodes are formed. Accordingly, uniformity in touch sensitivity is improved in various regions.

Third, variation in capacitance can be obtained by a sufficient fringe field even upon multi-touch, thus preventing ghost error.

Fourth, although the size of each unit cell increases in a large panel and the number of electrodes partitioned in unit cell thus increases, n (n is an integer of 2 or higher) sensors in a first direction and m (m is an integer of 2 or higher) sensors in a second direction are grouped and connected to a routing line. Accordingly, when the touch panel is applied to a large panel, as compared to a structure wherein one electrode is present in one sensing region, the number of routing lines required for application of scan signals is uniform, thus requiring no additional routing line, and eliminating the necessity of increasing a non-display region. As a result, a narrow bezel can be realized.

Fifth, it is unnecessary to increase a thickness of touch panels requiring a planarization plate in order to improve sensitivity. Accordingly, cost savings can be obtained. That is, sufficient touch sensitivity can be secured even with a minimum thickness performing optimal functions.

Sixth, touch sensitivity can be improved by dividing cells without modifying controllers. That is, 4-fold or more of fringe field is generated and variations in capacitance before and after touch are thus great, to considerably improve touch sensitivity, without increasing application of signals.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A touch panel, comprising:
a substrate having an active area and a dead area;
a plurality of first sensors in the active area of the substrate, each including a first series of a plurality of first electrodes serially connected by a plurality of first connection patterns, and a second series of a plurality of first electrodes serially connected by a plurality of first connection patterns, wherein the first and second series are parallel;
a plurality of second sensors in the active area of the substrate, each including a third series of a plurality of second electrodes serially connected by a plurality of second connection patterns, and a fourth series of a plurality of second electrodes serially connected by a plurality of second connection patterns, wherein the first sensors and the second sensors are crossing each other, wherein the third and fourth series are parallel;
a plurality of first redundancy patterns connecting the first series to the second series between the first series and the second series;
a plurality of second redundancy patterns connecting the third series to the fourth series between the third series and the fourth series,
at least one dummy pattern disposed between at least one of the plurality of first electrodes and at least one of the plurality of second electrodes that are adjacent to each other,
wherein the first electrodes of the first series are connected to the second electrodes of the second series by the first redundancy patterns to prevent line failure through a bypass between the first series and the second series in each of the first sensors in the active area, and
wherein the second electrodes of the third series are connected to the second electrodes of the fourth series by the second redundancy patterns between the third series and the fourth series in each of the second sensors in the active area;
a plurality of first routing lines in the dead area of the substrate, wherein each of the first routing lines is electrically connected to only ends of the first series of the first electrodes and the second series of the first electrodes in each first sensor by a first connection part; and
a plurality of second routing lines in the dead area of the substrate, wherein each of the second routing lines is electrically connected to only ends of the third series of the second electrodes and the fourth series of the second electrodes in each second sensor by a second connection part, wherein the first and second routing lines and the second connection pattern are directly on a first layer of the substrate in a same layer and include at least one metal selected from molybdenum (Mo), copper (Cu), silver (Ag), chromium (Cr), aluminum (Al), aluminum neodymium (AlNd) and molybdenum titanium (MoTi), or a laminate including the at least one metal, wherein the first and second series of the first electrodes, the third and fourth series of the second electrodes, the first connection pattern, the at least one first redundancy pattern and the at least one second redundancy pattern are on a second layer of the substrate in a same layer, and wherein the first connection patterns and the second connection patterns cross over each other, and the first redundancy patterns and the second redundancy patterns do not cross over each other.

2. The touch panel according to claim 1, wherein the first and second series of the first electrodes, the third and fourth series of the second electrodes, the first connection pattern, the at least one first redundancy pattern and the at least one second redundancy pattern on the second layer of the substrate are formed of a transparent material.

3. A touch panel, comprising:
a substrate,
a plurality of first sensors in an active area of the substrate and including a first series of a plurality of first electrodes serially connected by a plurality of first connection patterns, and a second series of a plurality of first electrodes serially connected by a plurality of first connection patterns, wherein the first and second series are parallel in a first direction;
a plurality of second sensors in the active area of the substrate and including a third series of a plurality of second electrodes serially connected by a plurality of second connection patterns, and a fourth series of a plurality of second electrodes serially connected by a plurality of second connection patterns, wherein the third and fourth series are parallel in a second direction that crosses the first direction;
a plurality of first redundancy patterns connecting an electrode of the first series to an electrode of the second series to prevent line failure through a bypass between the first series and the second series in the active area;
a plurality of second redundancy patterns connecting an electrode of the third series to an electrode of the fourth series to prevent line failure through a bypass between the third series and the fourth series in the active area;
a plurality of first routing lines and a plurality of second routing lines in a dead area of the substrate;
a plurality of first connection parts and a plurality of second connection parts in a dead area of the substrate;
at least one of dummy pattern disposed between at least one of the plurality of first electrodes and at least one of the plurality of second electrodes that are adjacent to each other, wherein only ends of the first series and the second series are electrically connected to one of the plurality of first connection parts, only ends of the third series and the fourth series are electrically connected to one of the plurality of second connection parts, wherein each of the first routing lines is electrically connected to the first series of the first electrodes and the second series of the first electrodes in each first sensor by one of the first connection parts; and a plurality of second routing lines, wherein each of the second routing lines is electrically connected to the third series of the second electrodes and the fourth series of the second electrodes in each second sensor by one of the second connection parts, wherein the first and second routing lines, and the second connection pattern are directly on a first layer of the substrate in a same layer and include at least one metal selected from molybdenum (Mo), copper (Cu), silver (Ag), chromium (Cr), aluminum (Al, aluminum, neodymium (AlNd) and molybdenum titanium (MoTi), or a laminate including the at least one metal, wherein the first and second series of the first electrodes, the third and fourth series of the second electrodes, the first connection pattern, the at least one first redundancy pattern, the at least one second redundancy pattern, and the first and second connection parts are on a second layer of the substrate in a same layer, wherein the first connection patterns and the second connection patterns cross over each other, and the first redundancy patterns and the second redundancy patterns do not cross over each other, and wherein the first and second series of the first electrodes, the third and fourth series of the second electrodes, the first connection pattern, the at least one first redundancy pattern, the at least one second redundancy pattern, and the first and second connection parts on the second layer.

4. The touch panel according to claim 3, wherein the at least one first redundancy pattern is integrated with the electrode of the first series and the electrode of the second series in the first direction.

5. The touch panel according to claim 3, wherein the at least one second redundancy pattern is integrated with the electrode of the third series and the electrode of the fourth series in the second direction.

6. The touch panel according to claim 3, wherein the plurality of first sensors includes n series of the plurality of first electrodes serially connected by the plurality of first connection patterns (n being an integer greater than 3),
the plurality of second sensors includes an m series of the plurality of second electrodes serially connected by the plurality of second connection patterns (m being an integer greater than 3),
the n series are connected to the one of the plurality of first connection parts, and
the m series are connected to the one of the plurality of second connection parts.

7. The touch panel according to claim 3, further comprising a plurality of pad electrodes connected to the plurality of first routing lines and the plurality of second routing lines.

8. The touch panel according to claim 3, wherein at least one of the plurality of first electrodes and at least one of the plurality of second electrodes have a polygonal shape, a diamond shape or a circular shape.

9. The touch panel according to claim 3, wherein a variation in capacitance by a fringe field between at least one of the plurality of first electrodes and at least one of the plurality of second electrodes in a portion touched by an input means is greater than a variation in capacitance when the at least one of the plurality of first electrodes or the at least one of the plurality of second electrodes is grounded.

10. The touch panel according to claim 3, wherein the dummy pattern has a width of about 10 μm to about 240 μm.

11. The touch panel according to claim 10, wherein a distance between the at least one of the plurality of first electrodes and the dummy pattern, and a distance between the at least one of the plurality of second electrodes and the dummy pattern are about 10 μm to about 30 μm.

12. The touch panel according to claim 3, further comprising a second insulating layer on the second layer.

13. The touch panel according to claim 12, wherein the second insulating layer includes one selected from a nitride layer, an oxide layer, a nitride oxide layer (SiNxOy) and an organic material layer with a thickness of about 0.1 μm to about 1 μm.

14. The touch panel according to claim 3, further comprising a polarization plate on the second layer.

15. The touch panel according to claim 14, wherein the polarization plate has a thickness of about 135 μm to about 270 μm.

16. The touch panel according to claim 3, wherein the touch panel is located on a display device.

17. The touch panel according to claim 16, wherein a substrate of the touch panel uses one substrate of the display device.

18. The touch panel according to claim 3, wherein a distance between a center portion of at least one of the plurality of first electrodes and a center portion of at least one of the plurality of second electrodes is about 0.5 mm to about 5.5 mm.

19. The touch panel according to claim 18, wherein a distance between the center portion of the at least one of the plurality of first electrodes and the center portion of the at least one of the plurality of second electrodes is about 1 mm to about 3 mm.

20. The touch panel according to claim 18, wherein a distance between the at least one of the plurality of first electrode and the at least one of the plurality of second electrode adjacent to each other is about 10 μm to about 30 μm.

21. The touch panel according to claim 3, wherein the first and second series of the first electrodes, the third and fourth series of the second electrodes, the first connection pattern, the at least one first redundancy pattern, the at least one second redundancy pattern, and the first and second connection parts on the second layer of the substrate are transparent electrodes as a same material.

22. The touch panel according to claim 21, wherein the transparent electrodes are composed of at least one selected from indium tin oxide (ITO), indium zinc oxide (IZO), antimony zinc oxide (AZO), ZnO and SnO$_2$ or a laminate thereof.

23. The touch panel according to claim 21, wherein the at least one of the plurality of first connection pattern or the at least one of the plurality of second connection patterns has a width of about 10 μm to about 500 μm.

24. The touch panel according to claim 3, wherein the first and second series of the first electrodes, the third and fourth series of the second electrodes, the first connection pattern, the at least one first redundancy pattern, the at least one second redundancy pattern, and the first and second connection parts on the second layer are composed of a metal.

25. The touch panel according to claim 24, wherein the metal constituting plurality of second connection patterns has a width of about 3 μm to about 20 μm.

26. The touch panel according to claim 24, further comprising a first insulating layer between the first layer and the second layer.

27. The touch panel according to claim 26, wherein the first insulating layer includes one selected from a nitride layer, an oxide layer, a nitride oxide layer (SiNxOy) and an organic material layer, with a thickness of about 0.1 μmto about 1 μm.

28. The touch panel according to claim 26, wherein the second layer is directly formed on the first insulating layer.

* * * * *